(12) United States Patent
Waymouth et al.

(10) Patent No.: US 6,380,341 B1
(45) Date of Patent: Apr. 30, 2002

(54) ETHYLENE COPOLYMERS WITH NARROW COMPOSITION DISTRIBUTION AND HIGH MELTING TEMPERATURES, AND METHODS OF PRODUCTION THEREOF

(75) Inventors: Robert M. Waymouth, Palo Alto; Jennifer L. Maciejewski Petoff, Sunnyvale, both of CA (US); Raisa L. Kravchenko, Wilmington, DE (US)

(73) Assignee: The Board of Trustees of Leland Stanford Jr. University, Palo Alto, CA (US)

(*) Notice: Subject to any disclaimer, the term of this patent is extended or adjusted under 35 U.S.C. 154(b) by 0 days.

(21) Appl. No.: 09/349,557

(22) Filed: Jul. 8, 1999

Related U.S. Application Data

(63) Continuation-in-part of application No. 09/227,228, filed on Jan. 8, 1999, now Pat. No. 6,169,151.
(60) Provisional application No. 60/071,050, filed on Jan. 9, 1998, and provisional application No. 60/137,107, filed on Jun. 2, 1999.

(51) Int. Cl.$^7$ ............... C08F 110/04; C08F 110/08; C08F 210/04; C08F 210/08

(52) U.S. Cl. ............... 526/348.5; 526/348.6; 526/160; 526/943
(58) Field of Search ............ 526/348.6, 348.5, 526/160, 943

(56) References Cited

U.S. PATENT DOCUMENTS 5,376,439 A * 12/1994 Hodgson et al. ............ 428/220

* cited by examiner

*Primary Examiner*—David W. Wu
*Assistant Examiner*—R. Harlan
(74) *Attorney, Agent, or Firm*—Innovation Law Group; Jacques M. Dulin

(57) ABSTRACT

A copolymer of ethylene and at least one comonomer containing at least 4 carbon atoms is characterized by a polydispersity greater than 2, a broad melting point transition as measured by differential scanning calorimetry, and a narrow composition distribution. Ethylene/$C_{4+}$ copolymers also may show at least one peak melting point above the peak melting point of a random copolymer of the same monomer unit composition. These copolymers are made by contacting ethylene and a comonomer under polymerization conditions in the presence of a suitable fluxional catalyst system.

42 Claims, 4 Drawing Sheets

E/T 1-Hexene Copolymer
72 mol% ET (Example 4)

(Example 19)

(Example 7)

ETHYLENE COPOLYMERS WITH NARROW COMPOSITION DISTRIBUTION AND HIGH MELTING TEMPERATURES, AND METHODS OF PRODUCTION THEREOF

CROSS REFERENCE TO RELATED APPLICATIONS

This application is a continuation-in-part of application Ser. No. 09/227,228 filed Jan. 8, 1999, U.S. Pat. No. 6,169,151 which claimed benefit of Provisional Application No. 60/071,050 filed Jan. 9, 1998; and further this application claims benefit of Provisional Application No. 60/137,107 filed Jun. 2, 1999, all of which are incorporated by reference herein.

FIELD OF THE INVENTION

This invention relates to thermoplastic polyolefins. More particularly, this invention relates to copolymers of ethylene with $C_{4+}$ olefin monomers which typically contain blocky structures as shown by peak melting temperatures above those measured in corresponding random copolymers with similar monomer composition, and to methods of production by use of fluxional metallocane catalysts.

BACKGROUND OF THE INVENTION

Thermoplastic olefin polymers represent a significant worldwide market with millions of tons of these polymers produced and sold each year. Copolymers of ethylene with $C_{4+}$ monomers are a substantial fraction of the worldwide olefin polymer production, especially in use as films. Although the bulk of ethylene polymers are thermoplastics, there is a growing further need for elastomeric thermoplastic olefin polymers.

Copolymers of ethylene with higher ($C_{4+}$) olefin monomers are well known and used in the art. Among these are linear low density polyethylenes conventionally produced as a copolymer of ethylene with 1-butene or 1-octene using traditional Ziegler-Natta catalyst systems. These materials typically have broad polydispersities, and broad composition distributions.

Some of these ethylene-$C_{4+}$ copolymers have a particularly broad range of application as elastomers. There are generally three families of elastomers made from such copolymers. One class is typified by ethylene-propylene copolymers (EPR) which are saturated compounds, optimally of low crystallinity, requiring vulcanization with free-radical generators to achieve excellent elastic properties. Another class of elastomer is typified by ethylene-propylene terpolymers (EPDM), again optimally of low crystallinity, which contain a small amount of a non-conjugated diene such as ethylidene norbornene. The residual unsaturation provided by the diene termonomer allows for vulcanization with sulfur, which then yields excellent elastomeric properties.

Yet a third class is typified by ethylene-alpha olefin copolymers of narrow composition distribution which possess excellent elastomeric properties even in the absence of vulcanization. For example U.S. Pat. No. 5,278,272, to Dow describes a class of substantially linear polyolefin copolymer elastomers with narrow composition distribution and excellent processing characteristics. These are produced with conventional metallocene-based catalyst systems which have narrow polydispersities, narrow composition distributions and melting point ranges corresponding to random copolymers. Representatives of these metallocene copolymers are ethylene/1-butene copolymers sold as Exact' brand by Exxon Chemical and ethylene/1-octene copolymers sold as Engage' brand by Dow Chemical. One of the limitations of these latter class of elastomers is their low melting temperature which limits their high temperature performance.

DISCLOSURE OF THE INVENTION

Summary, Objects and Advantages

This invention relates to copolymers of ethylene with $C_{4+}$ olefin monomers which may be thermoplastics or elastomers. Particularly, these copolymers typically are formed from a fluxional catalyst system which creates properties consistent with a blocky structure. A polymer chain with a blocky structure will contain segments of differing compositional microstructure. Thus, in an ethylene/hexene copolymer of this invention, the evidence indicates ethylene homopolymer blocks are distributed in the polymer chain with adjacent segments of ethylene/hexene copolymer. Since ethylene homopolymer segments will form regions of polyethylene crystallinity while ethylene/hexene copolymer segments will be amorphous, the polymer as a whole contains regions of polyethylene crystallinity interspersed with amorphous regions to a greater extent than would be observed in a copolymer of ethylene with randomly dispersed comonomer. Typically the upper peak melting temperatures for the copolymers of this invention are higher than corresponding random copolymers, although the melting transition is relatively broad and typically has multimodal or bimodal melting temperature peaks. This data indicates that the polymers of the present invention contain larger, more thermodynamically stable crystals and longer ethylene sequences than that present in a random ethylene polymer.

The broad melting range exhibited by the copolymers of this invention extending to higher melting temperatures than random polymers of similar branching, indicates the former crystallize to give a broader range of crystal types (high and low melting). The high melting crystals are a result of the non-random comonomer incorporation allowing the formation of longer runs of ethylene homopolymer sequences than occurs in random versions. The comonomer, such as hexene, interrupts crystallization and, thus, the largest and most stable crystal into which a polymer chain can crystallize is defined by the longest ethylene unit run length present.

Further, the copolymers of the invention show a narrow compositional distribution among fractions separated by crystallinity or molecular weight. The copolymers of this invention show improved optical properties, such as clarity and reduced haze in films, as follows from a narrower composition distribution. The copolymers of the invention also exhibit a relatively broad polydisperity, a property which results in superior processibility.

In another aspect of this invention, the olefin copolymers of the invention are characterized by low glass transition temperatures, melting points above about 90° C., high molecular weights, and a narrow composition distribution between chains. The copolymers of the invention are novel reactor blends that can be sequentially fractionated into fractions of differing crystallinities. These fractions nevertheless show compositions of comonomers which differ by less than 15% from the parent reactor blend. The invention also relates to a process for producing such copolymers by using unbridged fluxional metallocene catalysts that are capable of interconverting between states, each state having different copolymerization characteristics, i.e., each state having a different relative rate of insertion of a given ethylene or $C_{4+}$ monomer into the growing copolymer chain and preferential selectivity for different monomers under particular reaction conditions.

An important object of this invention is to provide methods of production of a novel class of polyolefin copolymers with a combination of commercially important physical characteristics, including: a molecular weight distribution, $M_w/M_n > 2$, a narrow composition distribution, $</=15\%$, high melting point index, melting points greater than about 90° C., and typically above the melting temperature of a random copolymer having the same monomer unit composition. It is a further object of this invention to produce a novel family of crystallizable, high-melting polyolefin copolymers having a narrow composition distribution where the melting point of the polymer is greater than about 90° C. It is a further object of this invention to produce a class of high-melting, multiblock, blend, and multiblock/blend polyolefin copolymer elastomers. These novel polymers are useful as thermoplastic materials as well as compatibilizers for other polyolefin blends.

The copolymers of this invention are produced using a new family of fluxional metallocene-based catalysts first described in U.S. Pat. No. 5,594,080, incorporated by reference herein. These catalysts produce blocky structures in the polymer chain which yield polymer products having a combination of properties which is advantageous for multiple use applications including films. This combination of properties include a narrow composition distribution, broad polydispersity, and a broad melting transition with an upper melting peak which typically is higher than a randomly distributed copolymer with the same monomer unit composition.

Products made from the copolymers of this invention benefit from the products improved processibility of the polymer, higher temperature performance range, and uniformity. Applications include films, including heat sealable films, and molded products. More particularly with respect to films, films can be produced with improved optical properties such as low haze and improved clarity.

The copolymers of the Invention can be characterized as copolymers of ethylene and at least one comonomer containing at least 4 carbon atoms having a polydispersity greater than 2, a broad melting point transition as measured by differential scanning calorimetry, and a narrow composition distribution. Ethylene/$C_{4+}$ copolymers of the invention also may show at least one peak melting point above the peak melting point of a random copolymer of the same monomer unit composition. These copolymers are made by contacting ethylene and a comonomer under polymerization conditions in the presence of a suitable fluxional metallocene catalyst system.

DETAILED DESCRIPTION INCLUDING THE BEST MODE OF CARRYING OUT THE INVENTION

Figure 1:
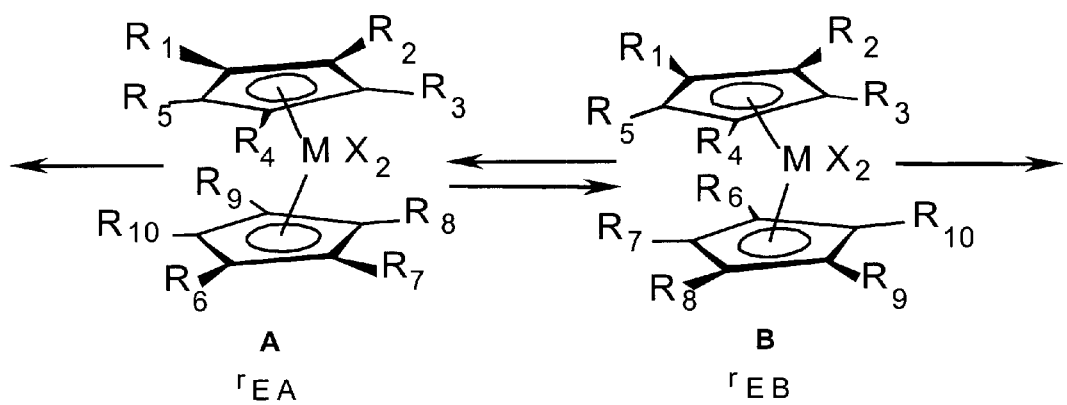
FIG. 1 is a stereoisomeric representation of unbridged metallocenes used in this invention having different substituents in the positions $R_1$ through $R_{10}$ with the arrows showing the interconversion between states A and B in which the reactivity toward ethylene, $r_E$, and other alpha olefins differs in the two states.

The following detailed description illustrates the invention by way of example, not by way of limitation of the principles of the invention. This description will clearly enable one skilled in the art to make and use the invention, and describes several embodiments, adaptations, variations, alternatives and uses of the invention, including what are presently believed to be the best modes of carrying out the inventions.

In this regard, the invention is illustrated in the several examples, and is of sufficient complexity that the many aspects, interrelationships, and sub-combinations thereof simply cannot be fully illustrated in a single example. For clarity and conciseness, several of the examples show, or report only aspects of a particular feature or principle of the invention, while omitting those that are not essential to or illustrative of that aspect. Thus, the best mode embodiment of one aspect or feature may be shown in one example or test, and the best mode of a different aspect will be called out in one or more other examples, tests, structures, formulas, or discussions.

All publications, patents and applications cited in this specification are herein incorporated by reference as if each individual publication, patent or application had been expressly stated to be incorporated by reference.

We have unexpectedly found that it is possible to prepare high melting polyolefins of narrow composition distribution using a class of unbridged, fluxional metallocenes as olefin polymerization catalysts.

For convenience, certain terms used throughout the specification are defined below.

The symbols "$</=$" and "$>/=$" mean "less than or equal to" and "greater than or equal to", respectively.

"Multiblock" polymer or copolymer means a polymer comprised of multiple block sequences of monomer units where the structure or composition of a given sequence differs from that of its neighbor. Furthermore, a multiblock copolymer as defined herein will contain a given sequence at least twice in every polymer chain.

The term "composition distribution" is the variation in co-monomer composition between different polymer chains and is described as a difference, in mole percent, of a given weight percent of a fractionated sample from the mean mole percent composition. The distribution need not be symmetrical around the mean; when expressed as a number (for example 10%), that number represents the larger of the distributions from the mean.

The term "elastomeric" refers to a material which tends to regain its shape after extension, such as one which exhibits a positive power of recovery after 100, 200 and 300% elongation.

The term "melting point index", also referred to as MPI=$T_m/X_c$, means the ratio of the melting point of the copolymer, Tm, to the mole fraction of the crystallizable component, $X_c$.

By "crystallizable component," we mean a monomer component whose homopolymer is a crystalline polymer. For ethylene copolymers exhibiting polyethylene crystallinity, the crystallizable component is ethylene.

The melting point (Tm) is taken as a maximum in a melting endotherm, as determined by differential scanning calorimetry (DSC). A polymer may have more than one $T_m$, if there are more than one maxima in the DSC thermogram.

Copolymers of this invention are characterized by a broad melting range as exhibited in a DSC thermogram, a narrow composition distribution over fractions separated by crystallinity or molecular weight; and a relatively broad molecular weight distribution (or polydispersity). This combination of characteristics produce an ethylene copolymer product having distinct and commercially significant properties.

The copolymers of this invention are formed from ethylene and an olefin monomer containing from 4 up to about 20 carbon atoms and typically from 4 to about 10 carbon atoms, herein termed a "$C_{4+}$" monomer. Preferable comonomers contain from 4 to 8 carbons. Representative comonomers include 1-butene, 1-pentene, 1-hexene, 4-methyl-1-pentene, 1-octene, and 1-decene. Butene, hexene, octene monomers are preferred with hexene being the most preferred. Mixtures of comonomers may be used.

The amount of comonomer which is incorporated into the copolymers of this invention may vary depending upon the properties desired. Typically, copolymers of this invention contain up to about 50 mole % (preferably up to 40 mole %) of comonomers. Typical copolymers may contain up to 30 or up to 10 mole percent of comonomers.

For highly crystalline polymers of higher density, copolymers of this invention may contain up to 10 and preferably up to 5 mole percent comonomers. Typically, the minimum amount of comonomer used in this invention depends on the amount of comonomer which is needed to alter the properties of ethylene homopolymer. This amount typically is greater than about one mole percent and often is more than about two mole percent.

The properties of the copolymer produced according to this invention may vary from elastomeric to those of a thermoplastic. Copolymers of the invention containing more than about 10 mole percent comonomer content typically have elastomeric properties. However, addition of hydrogen to the polymerization reaction can result in production of a plastomer having the same monomer composition as a copolymer which is an elastomer when hydrogen is not added.

Figure 3:
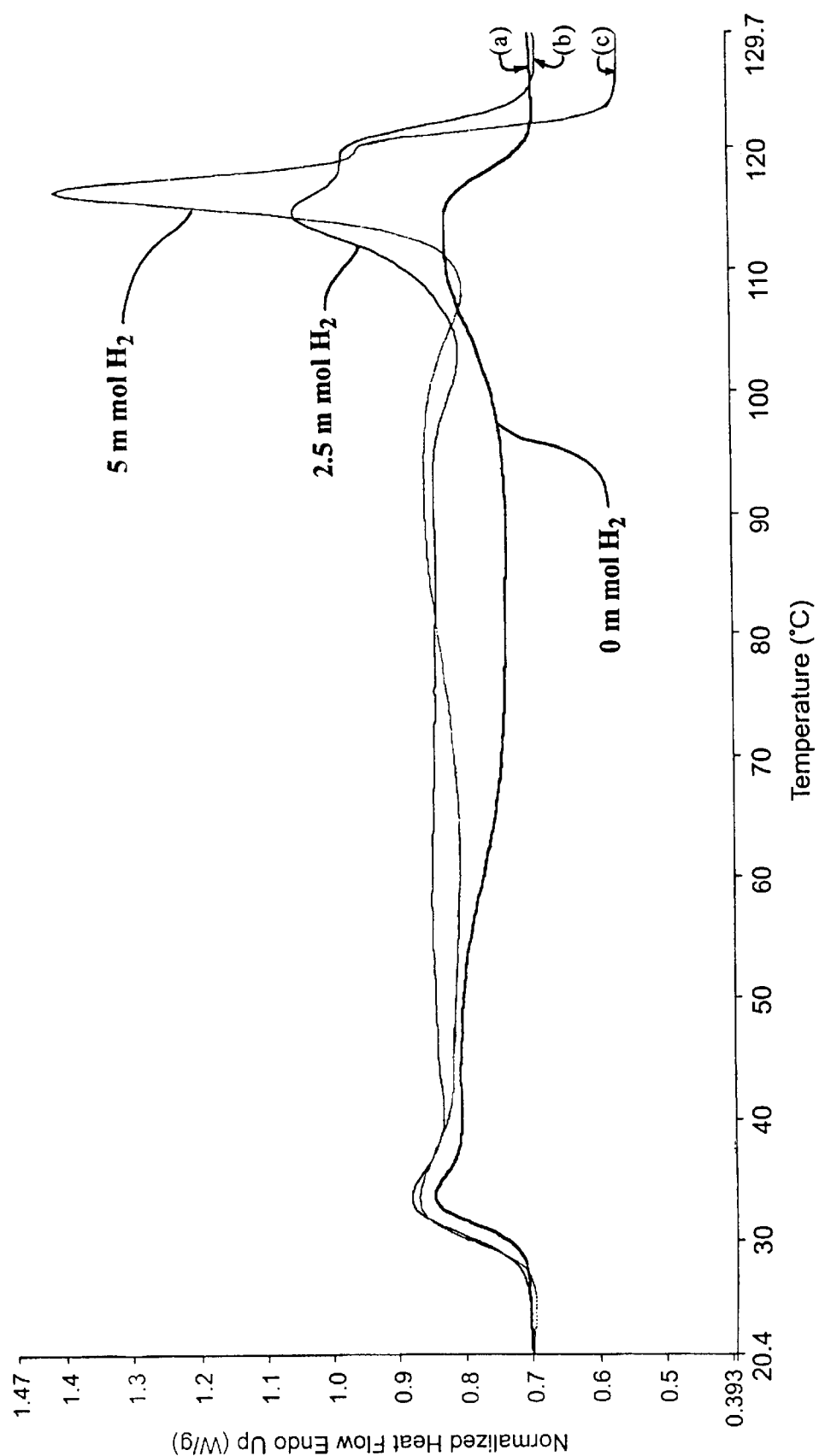
FIG. 3 shows superimposed DSC thermograms for ethylene-1-hexene copolymers produced with differing amounts of hydrogen, wherein the trace (a) product had no $H_2$ added; trace (b) product has 2.5 mmol $H_2$ added; and trace (c) product has 5.0 mmol $H_2$ added.

The ethylene copolymer products of the invention typically exhibit bimodal or multimodal crystalline melting temperature transitions with a broad region of crystalline melting. Although a crystalline melting temperature, $T_m$, may be assigned to the highest temperature peak in a DSC thermogram as illustrated in FIG. 3, a copolymer of this invention typically shows a broad melting temperature region and a low temperature melting point peak. A broad melting point range in a DSC thermogram indicates a distribution of crystals of different sizes and thermodynamic stabilities and correspondingly a distribution of crystallizable sequences in the polymer chains. Peaks in the thermogram indicate increased concentrations of crystals with similar stabilities. In some instances, there may be separated bimodal melting ranges. This indicates that most of the polymer chains have higher concentrations of high and low melting crystals and a lower concentration of crystals that melt at intermediate temperatures.

Melting temperature data reported in the Tables include multiple crystalline melting points. In these cases, (especially for copolymers having <95 mol % ethylene) the highest reported $T_m$ is above the melting point which would be expected for a copolymer with the same amount of randomly distributed comonomer. For very high ethylene-content copolymers (ethylene more than about 95 mol %), the melting temperature of a random copolymer will approach, or may be within experimental variation, of the highest $T_m$ observed in a blocky copolymer of this invention. However, the copolymers of this invention, even at this high ethylene content, exhibit broad, and sometimes multimodal, melting peaks, and are therefore clearly different in nature than random copolymers.

Polymers of this invention show a broad melting point range from the minimum to maximum melting temperature of from over 50° C. to more than 150° C. or above. Preferably, polymers may have melting temperature ranges of above 75° C. (often greater than 100° C.) up to about a 150° C. range. There may be multimodal, usually bimodal, maxima (reported as $T_m$'s) in the DSC thermograms within these broad ranges.

Molecular weight distribution (or polydispersity) is reported as weight average molecular weight divided by the number average molecular weight (Mw/Mn) as measured by gel permeation chromatography (GPC) techniques. In typical metallocene catalyst produced polymers, the polydispersity is narrow, $M_w/M_n=2$. A broader polydispersity typically enhances processibility of the polymer in processing equipment and many times results in higher throughput of the polymer in the process. An ability to increase throughput has significant economic advantages since process unit capacity increases without a need to purchase additional equipment.

Copolymers of this invention typically have molecular weight distributions (Mw/Mn) or polydispersities above 2 and usually above 3. Useful polydispersities may range up to 12 or above. Preferable copolymers of this invention have polydispersities ranging from about 3 to about 10 and more preferably from about 4 to about 9.

Another aspect of this invention is that the distribution of monomer unit composition is narrow in product fractions that are separated by crystallinity or molecular weight. For solvent fractionated products, which generally separate polymer chains by crystallinities, the range of co-monomer composition distribution typically varies by less than about 15 mole percent (15 mole %), preferably varies by less than about 12 mole %, and more preferably varies by less than 8–10 mole %. Even though the composition distribution is narrow for these fractions, the melting transitions measured by DSC may vary substantially among the solvent fractions. The solvents used for fractionation include diethylether (ether), hexanes (saturated $C_6$ isomers), and n-heptane at reflux conditions. Other compatible solvents may be used.

The polymers of this invention also typically exhibit very narrow composition distribution within fractions separated by molecular weight through a supercritical propane fractionation procedure. As described by McHugh and Krukonis, "Supercritical Fluid Extraction: Principles and Practice," 2d ed., Butterworth-Heinemann, 1994, incorporated by reference herein, solubility of a polymer in a fluid, such as propane, at supercritical conditions, is a function of pressure. Thus, supercritical fluid fractionation may be used to separate fractions of linear low density polyethylenes according to molecular weight and degree of short chain branching. Fractions of an inventive copolymer of differing molecular weights using a supercritical fluid, such as liquid propane, typically show a narrow composition distribution of less than 5%, preferably less than about 3%.

Particularly preferred, current best mode embodiments of the copolymers of the present invention have the following characteristics:

(a) a mole fraction of crystallizable component $X_c$ from 30–99%;

(b) a typical molecular weight distribution $M_w/M_n>2$; and (c) melting points above about 90° C.; and which copolymers comprise from 0–70% by weight of an ether soluble fraction, from 0–95% of a hexanes soluble fraction which can exhibit a melting range up to about 125° C., and from 0–95% of a hexanes insoluble fraction which can exhibit a melting range up to about 142° C.

The copolymers of the present invention in one preferred embodiment can be characterized as reactor blends in that they can be fractionated into fractions of differing degrees of crystallinity and differing melting points. Nevertheless, the comonomer composition of the various fractions of the copolymers are all within 15% of the composition of the resultant polymer product produced in the reactor.

The melting points of the copolymers of the present invention are high, typically above 90° C. and the melting point indices, $T_m/X_c$ are also high, typically above 80° C. and preferably above 115° C. The individual fractions can also exhibit high melting point indices. For example, it is possible to isolate a hexanes soluble fraction from the copolymers of the present invention that exhibits a melting point as high as 115° C. and a melting point index as high as 160° C. The glass transition temperatures ($T_g$) of the copolymers are low, typically less than −20° C. and preferably below −50° C.

The molecular weights of the polymers of the present invention can be quite high, with weight average molecular weights in excess of $M_w=1,000,000$ readily obtained and molecular weights as high as 2,000,000 observed. The molecular weight of the polymer product can be controlled, optionally, by controlling the temperature or by adding any number of chain transfer agents such as hydrogen or metal alkyls, as is well known in the art.

While not wishing to be bound by theory, it is believed that in the process of the invention, different active species of the fluxional catalyst are in equilibrium during the construction of the copolymer chains. This is provided for in the present invention by a class of unbridged metallocenes that are capable of isomerizing between states that have different copolymerization characteristics during the polymerization process, i.e. each state having a different relative rate of insertion of a given ethylene or $C_{4+}$ monomer into the growing copolymer chain and preferential selectivity for different monomers under particular reaction conditions. The process of the invention thus leads to multiblock copolymers or copolymer blends wherein the blocks or components of the blends have different compositions of comonomers.

The catalysts used in the present invention comprise unbridged, non-rigid (fluxional) metallocenes which can change their geometry with a rate that is within several orders of magnitude of the rate of formation of a single polymer chain, on average. In accordance with the invention, the relative rates of interconversion and of formation can be controlled by selecting the substituents (or absence thereof) on the cyclopentadienyl ligands so that they can alternate in structure between states of different coordination geometries which have different selectivity toward a particular comonomer.

One embodiment of the invention includes metallocene catalysts which are able to interconvert between states whose coordination geometries are different. Thus, the invention includes selecting the substituents of the metallocene cyclopentadienyl ligands so that the rate of interconversion of the two states is within several orders of magnitude of the rate of formation of a single polymer chain. That is, if the rate of interconversion between states of the catalyst, $r_i$, is greater than the rate of formation of an individual polymer chain, $r_f$, on average, the polymer resulting from use of the inventive process and catalysts can be characterized as multiblock (as defined above). If the rate of interconversion is less than the rate of formation, the result is a polymer blend. Where the rates are substantially balanced, the polymer can be characterized as a mixture of blend and multiblock. There may be a wide range of variations and intermediate cases amongst these three exemplars.

The nature of the substituents on the cyclopentadienyl ligands is critical; the substitution pattern of the cyclopentadienyl ligands should be such that the coordination geometries are different in order to provide different reactivities toward ethylene and other alpha olefins while in the two (or more) states (see FIG. 1), and that the rate of interconversion of the states of the catalyst are within several orders of magnitude of the rate of formation of a single chain. While not wishing to be bound by theory, it is currently believed that sterically demanding cyclopentadienyl substitients, such as a 3,5-disubstituted aryl group, provide optimized rates of interconversion between the two states.

Figure 2:
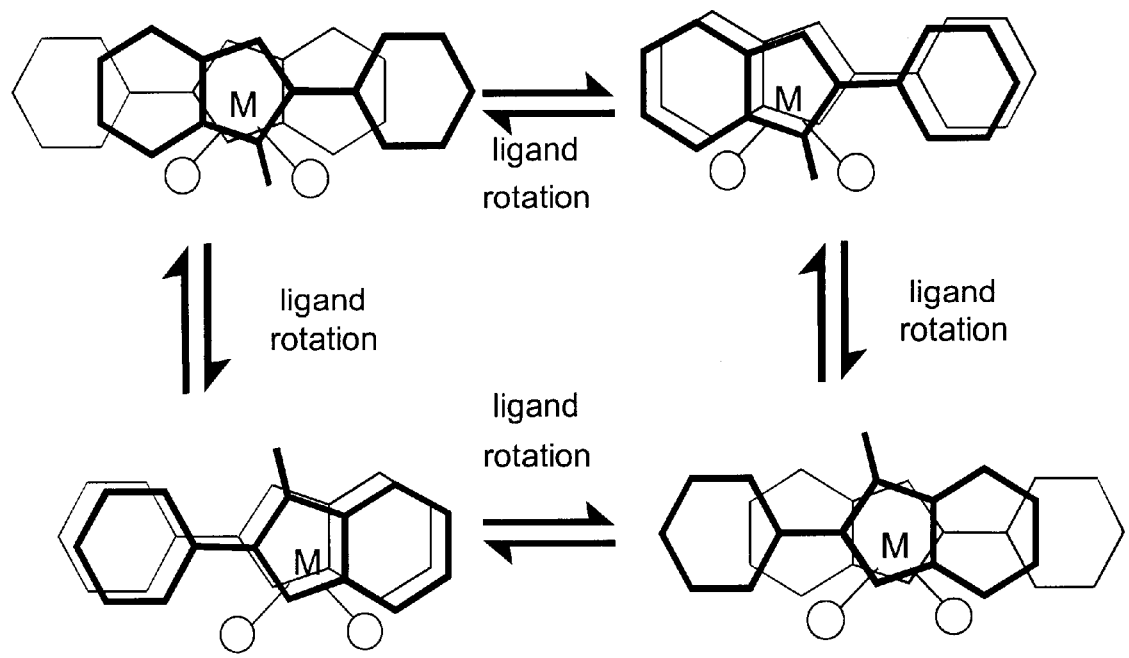
FIG. 2 shows four possible coordination geometries for unbridged metallocenes used in this invention, with the circles representing coordination sites for olefin insertion.

A further embodiment includes metallocene catalysts which are able to interconvert between more than two states whose coordination geometries are different. This is provided for by metallocenes with cyclopentadienyl-type ligands substituted in such a way that more than two stable states of the catalyst have coordination geometries that are different. For example, one embodiment of a catalyst with four geometries is illustrated in FIG. 2.

According to the process of this invention, the properties of the copolymers can be controlled by changing one or more of: the nature of the cyclopentadienyl units on the catalysts; the nature of the metal atom in the catalyst; and by changing the process conditions: e.g., by changing the nature of the comonomers; the comonomer feed ratio; the temperature; by presence of hydrogen; and/or control of other conventional process conditions.

Catalyst systems useful to produce copolymer of the present invention typically contain a transition metal component metallocene in the presence of an appropriate cocatalyst. In broad aspect, the transition metal compounds have the formula:

Formula 1

in which M is a Group 3, 4 or 5 Transition metal, a Lanthanide or an Actinide, X and X' are the same or different uninegative ligands, such as but not limited to hydride, halogen, hydrocarbyl, halohydrocarbyl, amine, amide, or borohydride substituents (preferably halogen, alkoxide, or $C_1$ to $C_7$ hydrocarbyl), and L and L' are the same or different polynuclear hydrocarbyl, silahydrocarbyl, phosphahydrocarbyl, azahydrocarbyl, arseni-hydrocarbyl or borahydrocarbyl rings, typically a substituted cyclopentadienyl ring or heterocyclopentadienyl ring, in combination with an appropriate cocatalyst. Exemplary preferred Transition Metals include titanium, vanadium, and, more preferably, zirconium or hafnium. An exemplary group 3 metal is yttrium, a Lanthanide is samarium, and an Actinide is thorium.

Preferably L and L' have the formula:

Formula 2

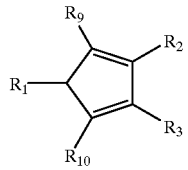

where $R_1$, $R_2$, $R_3$, $R_9$, and $R_{10}$ may be the same or different hydrogen, alkyl, alkylsilyl, aryl, alkoxyalkyl, alkoxyaryl, alkoxysilyl, aminoalkyl, aminoaryl or substituted alkyl, alkylsilyl or aryl substituents of 1 to about 30 carbon atoms.

Ligands of this general structure include substituted cyclopentadienes. Other ligands L and L' of Formula 2 for the production of ethylene copolymers include substituted cyclopentadienes of the general formula:

Formula 3

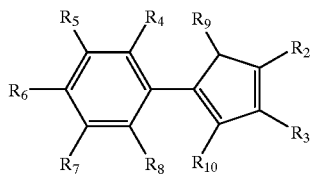

where $R_2$–$R_{10}$ have the same definition as $R_1$, $R_2$, $R_3$, $R_9$, and $R_{10}$ above.

Preferred L and L' of Formula 1 include ligands of Formula 2 wherein $R_1$ is an aryl group, such as a substituted phenyl, biphenyl, or naphthyl group, and $R_2$ and $R_3$ are connected as part of a ring of three or more carbon atoms. Especially preferred for L or L' of Formulas 1–3 for producing the copolymers of this invention are substituted indenyl ligands, more particularly 2-arylindene of formula:

Formula 4

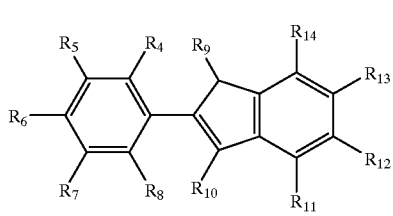

where $R_4$–$R_{14}$ may be the same or different hydrogen, halogen, aryl, hydrocarbyl, silahydrocarbyl, or halohydrocarbyl substituents. That is, $R_1$ of Formula 2 is $R_4$–$R_8$-substituted benzene, and $R_2$, $R_3$ are cyclized in a 6-carbon ring to form the indene moiety.

Preferred 2-aryl indenes include ligands in which $R_5$ and $R_7$ are substituents other than hydrogen such as aryl, hydrocarbyl, silahydrocarbyl, alkylsilyl, or halohydrocarbyl containing up to about 12 carbon atoms. Representative substituents include $C_1$–$C_6$ alkyls (preferably $C_3$–$C_6$ branched alkyls such as isopropyl, isobutyl, s-butyl, t-butyl, isoamyl), halogenated alkyls, and alkylsilyls, Particularly preferred sustituents are bulky such as t-butyl, triflouromethyl, and trimethylsilyl.

Other preferred ligands contain a non-hydrogen $R_9$ or $R_{10}$ substituent. Preferred substituents include lower ($C_1$–$C_6$) alkyls such as methyl or ethyl. Typically, a system containing an $R_9$ or $R_{10}$ substituent will create a fluxional metallocene catalyst system containing more than two rotational symmetry states.

In another preferred aspect of this invention the fluxional catalyst system contains a metallocene component containing two different ligands having preselected substituents that provide the requisite interconverting states as described above.

2-Aryl indenes useful to make fluxional metallocene catalysts in this invention include:

2-(3,5-dimethylphenyl)indene;
2-(3,5-bis-trifluoromethylphenyl)indene;
1-methyl-2-(3,5-bis-trifluoromethylphenyl)indene;
2-(3,5-bis-tertbutylphenyl)indene;
1-methyl-2-(3,5-bis-tertbutylphenyl)indene;
2-(3,5-bis-trimethyl- silylphenyl)indene;
1-methyl-2-(3,5-bis-trimethylsilylphenyl)indene;
2-(4-fluorophenyl)indene; 2-(2, 3, 4, 5-tetrafluorophenyl) indene;
2-(2, 3, 4, 5, 6-pentafluorophenyl)indene;
2-(1-naphthyl)indene; 2-(2-naphthyl)indene; and
2-[(4-phenyl)phenyl]indene; and 2-[(3-phenyl) phenyl] indene.

Typical fluxional metallocenes useful in this invention include:

bis[2-(3,5-dimethylphenyl)indenyl]zirconium dichloride;
bis[2-(3,5-bis-trifluoromethylphenyl)indenyl]zirconium dichloride;
bis[2-(3,5-bis-tertbutylphenyl)indenyl]zirconium dichloride;
bis[2-(3,5-bis-trimethylsilylphenyl)indenyl]zirconium dichloride;
bis[2-(4, -fluorophenyl)indenyl]zirconium dichloride;
bis[2-(2,3,4,5, -tetrafluorophenyl)indenyl]zirconium dichloride;
bis(2-(2,3,4,5,6-pentafluorophenyl)indenyl])zirconium dichloride;
bis[2-(1-naphthyl)indenyl]zirconium dichloride;
bis(2-(2-naphthyl)indenyl])zirconium dichloride;
bis[2-[(4-phenyl)phenyl]indenyl])zirconium dichloride;
bis[2-[(3-phenyl)phenyl]indenyl]zirconium dichloride;
(pentamethylcyclopentadienyl)(1-methyl-2-phenylindenyl)zirconium dichloride;
(pentamethylcyclopentadienyl)(2-phenylindenyl) zirconium dichloride;
(pentamethylcyclopentadienyl)(1-methyl-2-phenylindenyl)zirconium dimethyl;
(pentamethylcyclopentadienyl)(2-phenylindenyl) zirconium dimethyl;
(cyclopentadienyl)(1-methyl-2-phenylindenyl)zirconium dichloride;
(cyclopentadienyl)(2-phenylindenyl)zirconium dichloride;
(cyclopentadienyl)(1-methyl-2-phenylindenyl)zirconium dimethyl;
(cyclopentadienyl)(2-phenylindenyl)zirconium dimethyl;

(1-methyl-2-phenylindenyl)(2-phenylindenyl)zirconium dichloride;

(1-methyl-2-phenylindenyl)[2-(3,5-bis-trifluoromethylphenyl)indenyl]zirconium dichloride;

[1-methyl-2-(3,5-bis-trifluoromethylphenyl)indenyl](2-phenylindenyl) zirconium dichloride;

[1-methyl-2-(3,5-bis-trifluoromethylphenyl)indenyl][2-(3,5-bis-trifluoromethylphenyl)indenyl]zirconium dichloride; and (1-methyl-2-phenylindenyl)[2-(3,5-bis-tertbutylphenyl)indenyl]zirconium dichloride;

Typical fluxional metallocenes useful in this invention also include the corresponding hafnium compounds such as:

bis[2-(3,5-dimethylphenyl)indenyl]hafnium dichloride;

bis[2-(3,5-bis-trifluoromethyphenyl)indenyl]hafnium dichloride;

bis[2-(3,5-bis-tertbutylphenyl)indenyl]hafnium dichloride;

bis[2-(3,5-bis-trimethylsilylphenyl)indenyl]hafnium dichloride;

bis[2, (4-fluorophenyl)indenyl]hafnium dichloride;

bis[2-(2 ,3,4 ,5-tetrafluorophenyl)indenyl]hafnium dichloride;

bis[2-(2,3,4,5,6-pentafluorophenyl)indenyl]hafnium dichloride;

bis[2-(1-naphthyl)indenyl]hafnium dichloride;

bis[2-(2-naphthyl )indenyl]hafnium dichloride;

bis(2-((4-phenyl)phenyl)indenyl])hafnium dichloride;

bis[2-[(3-phenyl)phenyl]indenyl]hafnium dichloride;

(pentamethylcyclopentadienyl)(1-methyl-2-phenylindenyl)hafnium dichloride;

(pentamethylcyclopentadienyl)(2-phenylindenyl)hafnium dichloride;

(pentamethylcyclopentadienyl)(1-methyl-2-phenylindenyl)hafnium dimethyl;

(pentamethylcyclopentadienyl)(2-phenylindenyl)hafnium dimethyl;

(cyclopentadienyl)(1-methyl-2-phenylindenyl)hafnium dichloride;

(cyclopentadienyl)(2-phenylindenyl)hafnium dichloride;

(cyclopentadienyl)(1-methyl-2-phenylindenyl)hafnium dimethyl;

(cyclopentadienyl)(2-phenylindenyl)hafnium dimethyl;

(1-methyl-2-phenylindenyl)(2-phenylindenyl)hafnium dichloride;

(1-methyl-2-phenylindenyl)[2-(3,5-bis-trifluoromethylphenyl)indenyl]hafnium dichloride;

[1-methyl-2-(3,5-bis-trifluoromethylphenyl)indenyl][2-phenylindenyl)hafnium dichloride;

[1-methyl-2-(3,5-bis-trifluoromethylphenyl)indenyl][2-(3,5-bis) trifluoromethylphenyl)indenyl]hafnium dichloride;

(1methyl-2-phenylindenyl)[2(3,5-bis-tertbutylphenyl)indenyl]hafnium dichloride;

and the like.

Particularly preferred metallocene components include:

bis[2-(3,5-bis-trifluoromethyphenyl)indenyl]hafnium dichloride;

bis[2-(3,5-bis-tertbutylphenyl)indenyl]hafnium dichloride;

bis[2-(3,5-bis-trimethylsilylphenyl)indenyl]hafnium dichloride;

[1-methyl-2-(3,5-bis-trifluoromethylphenyl)indenyl](2-phenylindenyl)zirconium dichloride;

[1-methyl-2-(3,5-bis-trifluoromethylphenyl)indenyl][2-(3,5-bis-trifluoromethylphenyl)indenyl]zirconium dichloride;

bis[2-(3,5-bis-trifluoromethyphenyl)indenyl]hafnium dichloride;

bis[2-(3,5-bistertbutylphenyl)indenyl]hafnium dichloride;

bis[2-(3,5-bis-trimethylsilylphenyl)indenyl]hafnium dichloride;

[1-methyl-2-(3,5-bistrfluoromethylphenyl)indenyl](2-phenylindenyl)hafnium dichloride; and

[1-methyl-2-(3,5-bis-trifluoromethylphenyl)indenyl][2-(3,5-bis-trifluoromethylphenyl)indenyl]hafnium dichloride.

The Examples disclose a method for preparing the metallocenes in high yield. Generally, metallocenes are prepared by forming the indenyl ligand followed by metallation with the metal tetrahalide to form the complex in synthetic procedures known to the art.

Appropriate cocatalysts include alkylaluminum compounds, methylaluminoxane, or modified methylaluminoxanes, as illustrated in U.S. Pat. No. 4,542,199 to Kaminsky, et al.; Ewen, J. Am. Chem. Soc., 106 (1984), p. 6355; Ewen, et al., J. Am. Chem. Soc. 109 (1987) p. 6544; Ewen, et al., J. Am. Chem. Soc. 110 (1988), p. 6255; Kaminsky, et al, Angew. Chem., Int. Ed. Eng. 24 (1985), p. 507. Other useful cocatalysts include Lewis or protic acids, such as $B(C_6F_5)_3$ or $(PhNMe_2H)^+B(C_6F_5)_4^-$, which generate cationic metallocenes with compatible non-coordinating anions in the presence or absence of alkylaluminum compounds. Catalyst systems employing a cationic Group 4 metallocene and compatible non-coordinating anions are described in U.S. Pat. Nos. 5,198,119, 5,198,401, and 5,223,467; Marks, et al., J. Am. Chem. Soc., 113 (1991), p. 3623; Chien, et al., J. Am. Chem. Soc., 113 (1991), p. 8570; Bochmann et al., Angew. Chem. Intl., Ed. Engl. 7 (1990), p. 780; and Teuben et al., Organometallics, 11 (1992), p. 362, and references therein; all incorporated by reference herein.

In one of many embodiments, these catalyst systems may be placed on a suitable support such as silica, alumina, or other metal oxides, magnesium halide such as $MgCl_2$ or other supports. These catalysts can be used in the solution phase, in slurry phase, in the gas phase, or in bulk monomer. Both batch and continuous polymerizations can be carried out. Appropriate solvents for solution polymerization include liquefied monomer, and aliphatic or aromatic solvents such as toluene, benzene, hexane, heptane, diethyl ether, as well as halogenated aliphatic or aromatic solvents such as methylene chloride, chlorobenzene, fluorobenzene, hexaflourobenzene or other suitable solvents. Use of liquid hydrocarbon is preferred, such as hexane or heptane, to avoid halogenated waste streams. Various agents can be added to control the molecular weight, including hydrogen, silanes and metal alkyls such as diethylzinc.

The copolymers of this invention are prepared by contacting ethylene and at least one co-monomer with the above-described catalyst system under suitable polymerization conditions. Such conditions include polymerization or copolymerization temperature and time, pressure(s) of the monomer(s), avoidance of contamination of catalyst, choice of polymerization or copolymerization medium in slurry processes, the use of additives to control homopolymer or copolymer molecular weights, and other conditions well known to persons skilled in the art.

Typically, sufficient amounts of catalyst or catalyst component is used for the reactor system and process conditions selected. The amount of catalyst will depend upon the activity of the specific catalyst chosen.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to cause catalyst deactivation or polymer degradation. Generally, temperatures range from about 0° C. to about 120° C. with a range of from about 20° C. to about 95° C. being preferred from the standpoint of attaining good catalyst performance and high production rates. A preferable polymerization range according to this invention is about 50° C. to about 80° C.

Olefin polymerization or copolymerization according to this invention is carried out at monomer pressures of about atmospheric or above. Generally, monomer pressures range from about 20 to about 600 psi (140 to 4100 kPa), although in vapor phase polymerizations or copolymerizations, monomer pressures should not be below the vapor pressure at the polymerization or copolymerization temperature of the alpha-olefin to be polymerized or copolymerized.

The polymerization or copolymerization time will generally range from about ½ to several hours in batch processes with corresponding average residence times in continuous processes. Polymerization or copolymerization times ranging from about 1 to about 4 hours are typical in autoclave-type reactions. In slurry processes, the polymerization or copolymerization time can be regulated as desired. Polymerization or copolymerization times ranging from about ½ to several hours are generally sufficient in continuous slurry processes.

Examples of gas-phase polymerization or copolymerization processes in which the catalyst or catalyst component of this invention is useful include both stirred bed reactors and fluidized bed reactor systems and are described in U.S. Pat. Nos. 3,957,448; 3,965,083; 3,971,786; 3,970,611; 4,129,701; 4,101,289; 3,652,527; and 4,003,712, all incorporated by reference herein. Typical gas-phase olefin polymerization or copolymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer, typically, is provided to the reactor through a recycle gas system in which unreacted monomer removed as off-gas and fresh feed monomer are mixed and injected into the reactor vessel. A quench liquid, which can be liquid monomer, can be added to polymerizing or copolymerizing olefin through the recycle gas system in order to control temperature.

Irrespective of polymerization or copolymerization technique, polymerization or copolymerization is carried out under conditions that exclude oxygen, water, and other materials that act as catalyst poisons. Also, according to this invention, polymerization or copolymerization can be carried out in the presence of additives to control polymer or copolymer molecular weights. Hydrogen typically is employed for this purpose in a manner well known to persons of skill in the art. Although not usually required, upon completion of polymerization or copolymerization, or when it is desired to moderate or terminate polymerization or copolymerization or at least temporarily deactivate the catalyst or catalyst component of this invention, the catalyst can be contacted with water, alcohols, carbon dioxide, oxygen, acetone, or other suitable catalyst deactivators in a manner known to persons of skill in the art.

The polymerization of olefins according to this invention is carried out by contacting the olefin(s) with the catalyst systems comprising the transition metal fluxional component and in the presence of an appropriate cocatalyst, such as an aluminoxane, a Lewis acid such as $B(C_6F_5)_3$, or a protic acid in the presence of a non-coordinating counterion such as $B(C_6F_5)_4^-$.

The metallocene catalyst systems of the present invention are particularly useful for the polymerization of ethylene and $C_{4+}$ alpha-olefin co-monomers as well as alpha-olefin monomer mixtures to produce co-polymers with novel thermoplastic, plastomeric and elastomeric properties. The properties of elastomers are characterized by several variables. The tensile set (TS) is the elongation remaining in a polymer sample after it is stretched to an arbitrary elongation (e.g. 100% or 300%) and allowed to recover. Lower set indicates higher elongational recovery. Stress relaxation is measured as the decrease in stress (or force) during a time period (e.g. 30 sec. or 5 min.) that the specimen is held at extension. There are various methods for reporting hysteresis during repeated extensions. In the present application, retained force is measured as the ratio of stress at 50% elongation during the second cycle recovery to the initial stress at 100% elongation during the same cycle. Higher values of retained force and lower values of stress relaxation indicate stronger recovery force. Better general elastomeric recovery properties are indicated by low set, high retained force and low stress relaxation.

The metallocene catalysts of the present invention are represented in one embodiment in FIG. 1 where the ligands L and L' are substituted cyclopentadienyl rings. As shown in the Figure, in state A cyclopentadienyl substituents $R_1$, $R_2$ and $R_6$ and $R_7$ project over the ligands X=X' whereas in state B, cyclopentadienyl substituents $R_1$, $R_2$ and $R_8$ and $R_9$ project over the ligands X=X'. As provided for in the process of this invention, catalysts derived from these metallocenes where substituents $R_6$ and $R_7$ are different from $R_8$ and $R_9$ will exhibit reactivity ratios for ethylene in state A ($r_{EA}$) different from that in state B ($r_{EB}$).

In another embodiment of the invention, fluxional metallocene catalysts incorporating hafnium may exhibit increased reactivity to the higher olefin copolymer (such as hexene, $r_H$) relative to the polymerization reactivity to ethylene ($r_E$).

Another embodiment of the invention is illustrated in FIG. 2 where the ligands L and L' are different substituted 2-arylindenyl ligands such that the metallocene interconverts between four states with different coordination geometries. As shown in FIG. 3, in two states a methyl group projects over the coordination sites for olefin insertion (represented in this figure by circles) and in two states the methyl group projects away from the coordination sites for the olefin.

The following Examples and Comparative Runs illustrate, but do not limit the inventions described herein.

EXAMPLES

All organometallic reactions were conducted using standard Schlenk and drybox techniques. Elemental analyses were conducted by E+R Microanalytical Laboratory. Unless otherwise specified all reagents were purchased from commercial suppliers and used without further purification. 2-Phenylindene, 1-methyl-2-phenylindene, 2-(bis(3',5'-trifluoromethyl) phenylindene, bis(2-phenylindenyl)

zirconium dichloride, rac- and meso-bis(1-methyl-2-phenylindenyl)zirconium dichloride, ethylene-bis(indenyl) zirconium dichloride, and bis(2-(bis(3',5'-trifluoromethyl) phenylindenyl)-zirconium dichloride were prepared according to the literature procedures (Kravchenko, R.; Waymouth, R. M. *Macromolecules* 1998, 31, 1–6.) Hexane, pentane and methylene chloride used in organometallic synthesis were distilled from calcium hydride under nitrogen. Tetrahydrofuran was distilled from sodium/benzophenone under nitrogen. Toluene, ethylene and propylene were passed through two purification columns packed with activated alumina and supported copper catalyst. 1-Hexene and chloroform-$d_3$ were distilled from calcium hydride and benzene-$d_6$ was distilled from sodium/benzophenone.

Metallocenes 1–3

Ethylene-bis(indenyl)zirconium dichloride (Metallocene 1): This complex was prepared as described in Wild, F. R. W. P.; Wasiucionek, M.; Huttner, G.; Brintzinger, H. H. J. Organomet. Chem. 1985, 288, 63–7.

Bis(2-phenylindenyl)zirconium dichloride (Metallocene 2): This complex was prepared as described in Bruce, M. D.; Coates, G. W.; Hauptman, E.; Waymouth, R. M.; Ziller, J. W. *J. Am. Chem. Soc.* 1997, 119, 11174–11182.

Bis(2-phenylindenyl)hafnium dichloride (Metallocene 3): This complex was prepared as described in Bruce, M. D.; Coates, G. W.; Hauptman, E.; Waymouth, R. M.; Ziller, J. W. *J. Am. Chem. Soc.* 1997, 119, 11174–11182.

Ligand A 2-(Bis-3,5-Trifluoromethylphenyl)indene

A 3-neck 500 mL round-bottomed flask fitted with a condenser and an addition funnel was charged with 2.62 g (0.11 mol) of Mg turnings and 20 mL of anhydrous diethyl ether. Slow addition of a solution of 25.10 g (0.09 mol) of 3,5-bis(trifluoromethyl) bromobenzene in diethyl ether (100 mL), followed by refluxing for 30 min, gave a brown-gray solution of the aryl Grignard reagent. The solution was cooled to room temperature (RT), filtered over a plug of Celite and evacuated to yield a brown oil. Toluene (40 mL) was added and the suspension cooled to 0° C. whereupon a solution of 2-indanone (9.22 g, 0.07 mol)in toluene (60 mL) was added dropwise to give a tan-brown slurry. This mixture was warmed to room temperature and stirred for an additional 3 hours. After cooling to 0°C. it was quenched with 150 mL of water, hexane (200 mL) added and the reaction mixture neutralized with 5M HCl. The organic layer was separated, and the aqueous layer was extracted with two 50-mL portions of hexane. The combined organic layers were washed with two 50-mL portions of brine and dried over anhydrous magnesium sulfate. After filtration over Celite, the solvent was removed under vacuo yielding 21.5 g (89% based on 2-indanone) of 2-(bis-3,5-trifluoromethylphenyl)indanol as an off-white solid. $^1$H NMR (CDCl$_3$, 23 C, 400 MHz): δ 8.05 (s, 2H), 7.80 (s, 1H), 7.5–7.0 (M, 4H), 3.41 (m, 4H), 2.21 (s, 1H, OH). Under argon, this alcohol (21.5 g, 0.06 mol) and p-toluene-sulfonic acid monohydrate (800 mg) were dissolved in toluene (250 mL) and the solution was heated to reflux for 6 hours to afford 14.4 g, (70%) of 2-(bis-3,5(trifluoromethyl)-phenyl) indene upon recrystallization from diethyl ether/hexane at −18° C. $^1$H NMR (CDCl$_3$, 23° C., 400 MHz): δ 8.01 (s, 2H, Ar$_f$), 7.75 (s, 1H, Ar$_f$), 7.52 (d, J=7 Hz, 1H), 7.47 (d, J=7 Hz, 1H), 7.43 (s, 1H), 7.33 (dd, 2J=7 Hz, 1H), 7.27 (dd, 2J=7 Hz, 1H), 2.83 (s, 2H). $^{13}$C NMR (CDCl$_3$, 23 C, 100 MHz): δ 144.3 (s), 143.1 (s), 138.0 (s), 132.1 (q, $^2J_{C-F}$=33 Hz), 130.1 (d, $J_{C-H}$=167 Hz), 127.0 (dd), $J_{C-H}$=160 Hz, $^2J_{C-H}$=7 Hz), 126.0 (dd, $J_{C-H}$=159 Hz, $^2J_{C-H}$=7 Hz), 125.2 (brd, $J_{C-H}$=162 Hz), 123.9 (dd, $J_{C-H}$=156 Hz, $^2J_{C-H}$=9 Hz), 123.4 (q, $J_{C-F}$=273 Hz, $\underline{C}$F$_3$), 121.8 (dd, $J_{C-H}$=160 Hz, $^2J_{C-H}$=8 Hz), 120.6 (brd, $J_{C-H}$=167 Hz), 38.9 (td, $J_{C-H}$=127 Hz, $^2J_{C-H}$=7 Hz, $\underline{C}$H$_2$). C,H analysis: Anal. Found (Calcd): C, 62.45 (62–20); H 3.01 (3.07).

Metallocene 4

Bis(2-(3,5-Trifluoromethylphenyl)indenyl)zirconium Dichloride

N-Butyllithium (2.5 M in hexanes, 0.850 mL, 2.13 mmol) was added to a solution of 2-(bis-3,5-trifluoromethylphenyl) indene (Ligand A) (648 mg, 1.97 mmol) in toluene (15 mL). The heterogeneous solution was stirred at ambient temperature for 4 hours 30 minutes to give a green-yellow solution which was treated with a suspension of ZrCl$_4$ (240 mg, 1.03 mmol)in toluene (20 mL) via cannula. The yellow suspension was stirred at room temperature for 2.5 hours, heated to ca. 80° C., and filtered over a plug of Celite. After washing the Celite with hot toluene several times (3×10 mL), the filtrate was concentrated and cooled to −18 C to give 442 mg (55%) of light yellow crystals of Bis(2-(Bis-3,5-trifluoromethylphenyl)-indenyl)zirconium dichloride. $^1$H NMR (C$_6$D$_6$, 23° C., 400 MHz): δ 7.67 (s, 2H, Ar$_f$), 7.55 (s, 4H, Ar$_f$), 7.19 (m, 4H, Ar), 6.89 (m, 4H, Ar), 5.96 (s, 4H, Cp-H). $^{13}$C NMR (C$_6$D$_6$, 23 C, 100 MHz: δ 135.6 (s), 133.1 (s), 131.6 (q, $^2J_{C-F}$=33 Hz), 127.1 (brd, $J_{C-H}$=161 Hz), 126.8 (s), 126.4 (dd, $J_{C-H}$=161 Hz, $^2J_{C-H}$=8 Hz), 125.4 (dd, $J_{C-H}$=167 Hz), $^2J_{C-H}$=5 Hz), 123.8 (q, $J_{C-F}$=273 Hz, $\underline{C}$—F), 121.8 (brd, $J_{C-H}$=159 Hz), 102. 5 (dd, $J_{C-H}$=176 Hz, $^2J_{C-H}$=7 Hz, Cp ($\underline{C}$—H). C,H analysis: Anal. found (Calcd.): C, 49.99 (50.01); H 2.32 (2.22).

Metallocene 5

Bis(2-(3,5-Trifluoromethylphenyl)indenyl)hafnium Dichloride

N-Butyllithium (1.6M in hexanes, 2 mL. 3.20 mmol) was added dropwise at room temperature to a solution of 2-(bis-3,5-trifluoromethylphenyl)indene (1.03 g. 3.14 mmol)in diethyl ether (10 mL). After stirring for 30 min, the solvent was removed in vacuo leaving a green-yellow solid. In a drybox, HfCl$_4$, (510 mg, 1.59 mmol) was added to the lithium salt. The solids were then cooled to −78° C. at which temperature toluene (45 mL) was slowly added. The flask was allowed to reach ambient temperature and the suspension was stirred for 24 hours after which time it was heated for 15 min to ca. 80° C. (heat gun). The solvent was then removed in vacuo. The solid was extracted with CH$_2$Cl$_2$ (50 mL) and the solution filtered over a plug of Celite. After washing the Celite with 4×15 mL CH$_2$Cl$_2$, the solvent was removed in vacuo from the filtrate. The solid was dissolved in 15 mL of CH$_2$Cl$_2$, filtered and over filtrate a layer of hexane (40 mL) was slowly added. Crystals of Bis(2-(bis-3,5-trifluoromethylphenyl)indenyl)hafnium dichloride Catalyst E were obtained from this layered solution at −18 C. $^1$H NMR (C$_6$D$_6$, 23° C., 200 MHz); δ 7.65 (s, 2H, Ar$_f$), 7.51 (s, 4H, Ar$_f$), 6.7–7.3 (m, 8H Ar), 5.63 (s, 4H, Cp-H). $^{13}$C NMR (C$_6$D$_6$ 23° C., 100 MHz): δ 135.8 (s), 132.9 (s), 131.6 (q, $^2J_{C-F}$=34 Hz), 127.2 (brd, $J_{C-H}$=160 Hz), 126.3 (dd, $J_{C-H}$=161 Hz, $^2J_{C-H}$=8 Hz), 126.0 (s), 125.6 (dd, $J_{C-H}$=167 Hz, $^2J_{C-H}$=5 Hz), 123.8 (q, $J_{C-F}$=273 Hz, $\underline{C}$F$_3$), 121.7 (brd, $J_{C-H}$=161 Hz), 100.1 (dd, $J_{C-H}$=176 Hz, $^2J_{C-H}$=6 Hz, Cp $\underline{C}$—H). C, H analysis: Anal. Found (Calcd.): C, 45.10 (45–18); H, 1.87 (2.01).

Ligands B-C

1-Methyl-2-(bis-3',5'-trifluoromethylphenyl)indene (Ligand B), and 3-Methyl-2-(bis-3',5'-trifluoromethylphenyl)indene (Ligand C)

A solution of 2-(bis-3',5'-trifluoromethylphenyl)indene (Ligand A) (1.819 g, 5.54 mmol)in tetrahydrofuran (30 mL)

was cooled to −78° C. and n-butyllithium (2.5 M in hexanes, 2.33 mL, 5.82 mmol) was added dropwise. The resulting orange-brown solution was allowed to warm to room temperature and stirred for an additional 30 min. Then CH$_3$I (1.20 mL, 19 mmol) was added to this solution and the greenish reaction mixture was stirred for 20 h at room temperature. Methanol (20 mL) was added and the solvents removed in vacuo. The resulting brown solid was extracted with toluene (30 mL) and filtered through a glass frit packed with Celite. The brown solution was washed with H$_2$O (2×10 mL) and saturated NaCl solution (2×10 mL), dried over MgSO$_4$, and then evaporated to dryness. Crystallization from hexanes gave yellow crystals of Ligand B (1.073 g). $^1$H NMR (20° C., CDCl$_3$, 400 MHz): δ 7.87 (s, 2H), 7.75 (s, 1H), 7.49 (d, 1H, J=7.3 Hz), 7.42 (d, 1H, J=7.6 Hz), 7.37 (t, 1H, J=7.3 Hz), 7.26 (td, 1H, J=7.3 Hz, J=1.2Hz), 3.78 (s, 2H), 2.33 (s, 3H). Anal. Calcd (Found) for C$_{18}$H$_{12}$F$_6$: C, 63.16 (63.12); H 3.53 (3.62). Repeated crystallization from hexanes gave a mixture of isomers of Ligands B and C (309 mg) in 4:1 ratio. $^1$H NMR: 3.14 (q, 1H, J=7.0 Hz), 0.87 (d, 3 H, J=7.1 Hz). Overall yield 1.073 g, 73%.

(2-Phenylindenyl)zirconium Trichloride

Solid Zr(NMe$_2$)$_4$ (1.280 g, 4.785 mmol) and 2-phenylindene (0.920 g, 4.785 mmol) were combined with toluene (30 mL) in a 100-mL Schlenk tube and the resulting pale yellow solution was stirred for 2.5 h at room temperature under slightly reduced pressure. Then the solution was evaporated to dryness to give a yellow oil which was extracted with pentane (20 mL) and filtered through a cannula fitted with a double layer of filter paper. The resulting pentane solution was concentrated to a total volume of 10 mL and placed into a −50° C. freezer overnight. The resulting yellow solid was isolated, dried in vacuo, and redissolved in CH$_2$Cl$_2$ (15 mL). The pale yellow solution was cooled to 0 C and chlorotrimethylsilane (2 mL, 15.8 mmol) was added via syringe. The bright yellow solution was allowed to warm to room temperature and stirred for 1 h. Then the solution was evaporated to dryness to yield a yellow/orange foamy solid. Toluene (30 mL) was added and the mixture was stirred for 48 h to yield a lemon yellow powder, which was isolated and dried in vacuo (1.098 g, 59% yield). This material was used without further purification.

Metallocene 6
(2-Phenylindenyl)(1-methyl-2-phenylindenyl)zirconium Dichloride

Butyllithium (2.5 M in hexane, 0.43 mL, 1.08 mmol) was added via syringe to the solution of 1-methyl-2-phenylindenyl (212 mg, 1.029 mmol) in diethyl ether (25 mL) at −78° C. The resulting light yellow solution was allowed to warm to room temperature and stirred for additional 30 min. The ether was removed in vacuo to yield a white powdery solid, which was combined with solid (2-phenylindenyl)zirconium trichloride (400 mg, 1.029 mmol) and toluene (50 mL). The resulting suspension was stirred for 24 h at room temperature. Gradually the solids dissolved to give a yellow turbid solution. The mixture was filtered through a glass frit packed with Celite and then evaporated to dryness. The resulting yellow solid was recrystallized from CH$_2$Cl$_2$ (10 mL) layered with pentane (30 mL) at −50° C. to give Metallocene 6, 181 mg, 31% yield. $^1$H NMR (20° C., C$_6$D$_6$, 400 MHz): δ 7.41 (d, 2H, J=11.2 Hz), 7.30 (d, 2H, J=10.8 Hz), 7.24–6.80 (m, 13H), 6.73 (d, 1H, J=11.2 Hz), 6.50 (d, 1H, J=3.2 Hz), 6.26 (d, 1H, J=3.3 Hz), 5.98 (s, 1H), 2.42 (s, 3H). $^{13}$C {$^1$H} NMR (20° C., CDCl$_3$, 125 MHz): δ 133.75 (C), 133.10 (C), 132.38 (C), 131.41 (C), 129.54 (C), 129.06 (C—H), 128.90 (C—H), 128.70 (C—H), 128.67 (C—H), 128.14 (C—H), 126.95 (C), 126.72 (C—H), 126.58 (C—H), 126.56 (C—H), 126.43 (C—H), 126.26 (C—H), 125.58 (C—H), 125.05 (C), 124.90 (CH), 124.56 (C), 124.35 (C—H), 123.68 (C—H), 121.43 (C), 104.34 (C—H, Cp), 100.70 (C—H, Cp), 99.00 (C—H, Cp), 12.54 (CH$_3$). Anal. Calcd (Found) for C$_{31}$H$_{24}$Cl$_2$Zr: C 66.65 (66.92); H 4.33 (4.36).

Metallocene 7
(2-Phenylindenyl)(1-methyl-2-(bis-3',5'-trifluoromethylphenyl)indenyl)zirconium Dichloride Butyllithium (2.5 M in hexanes, 0.43 mL, 1.08 mmol) was added to the pale yellow solution of 1-methyl-2-(bis-3',5'-trifluoromethylphenyl)indene (352 mg, 1.029 mmol) in diethyl ether (20 mL) at −78° C. via syringe. The resulting yellow solution was allowed to warm to room temperature and stirred for additional 30 min. Ether was removed in vacuo to yield a pale yellow solid which was washed with pentane (20 mL) and combined with solid (2-phenylindenyl) zirconium trichloride (400 mg, 1.029 mmol) and toluene (50 mL). The resulting suspension was stirred for 24 h at room temperature. Gradually the solids dissolved to give a yellow turbid solution. This solution was filtered through a glass frit packed with Celite and then evaporated to dryness. The yellow solid Metallocene 7 was recrystallized from CH$_2$Cl$_2$ (10 mL) layered with pentane (20 mL) at −50° C.: (245 mg, 34%). $^1$H NMR (20° C., C$_6$D$_6$, 400 MHz): δ 7.67 (s, br, 1H), 7.64 (s, br, 2H), 7.30–6.78 (m, 13H), 6.43 (d, 1H, J=2.4 Hz), 6.19 (d, 1H, J=2.4 Hz), 5.59 (s, 1H), 5.32 (s, ⅓ H, CH$_2$Cl$_2$), 2.24 (s, 3H). $^{13}$C {$^1$H} NMR (20° C., CDCl$_3$, 125 MHz): δ 135.91 (C—H), 133.59 (C), 132.58 (C), 131.47 (C—CF$_3$, $^2$J$_{C-F}$=33 Hz), 130.76 (C), 130.51 (C), 129.02 (C—H), 128.98 (C—H), 128.80 (C—H), 126.87 (C—H), 126.81 (C—H), 126.77 (C—H), 126.62 (C—H), 126.52 (C—H), 126.25 (C—H), 126.21 (C), 125.34 (C—H), 125.05 (C), 124.09 (C—H), 123.86 (C), 123.23 (CF$_3$, J$_{CF}$=273 Hz), 123.17 (C), 121.24 (C—H, br), 119.25 (C), 102.70 (C—H, Cp), 101.76 (C—H, Cp), 99.30 (C—H, Cp), 12.12 (CH$_3$). Anal. Calcd (Found) for C$_{33}$H$_{22}$Cl$_2$F$_6$Zr×⅙.CH$_2$Cl$_2$: C 55.86 (56.20); H 3.37 (3.18). After having been stored for 3–4 weeks in the drybox in a clear vial the yellow compound turned green in color. No changes in $^1$H NMR spectrum were detected upon the color change.

(2-(Bis-3',5'-trifluoromethylphenyl)indenyl)zirconium trichloride.MeSiNMe$_2$

Solid Zr(NMe$_2$)$_4$ (1.260 g, 4.713 mmol) and 1-methyl-2-(bis-3',5'-trifluoromethylphenyl)indene (1.505 g, 4.58 mmol) were combined with toluene (30 mL) in a 100-mL Schlenk tube and the resulting greenish-brown solution was stirred for 2.5 h at room temperature under slightly reduced pressure. Then the solution was evaporated to dryness to give greenish-brown solid, which was extracted with pentane (30 mL) and filtered through a cannula fitted with a double layer of filter paper. The resulting pentane solution was concentrated to a total volume of 8 mL and placed in a −50° C. freezer overnight. Greenish-brown crystals formed. They were isolated, dried in vacuo and redissolved in CH$_2$Cl$_2$ (20 mL). The resulting solution was cooled to 0° C. and chlorotrimethylsilane (2 mL, 15.8 mmol) was added via syringe. The turbid yellow solution was allowed to warm to room temperature, stirred for 1 h, concentrated to a total volume of 1 mL and then diluted with toluene (30 mL). The resulting suspension was stirred for 24 h. The lemon yellow powdery solid was isolated and dried in vacuo (1.390 g, 46%). $^1$H NMR (20° C., CDCl$_3$, 400 MHz): δ 8.19–8.17 (br, 1H), 8.10 (br, 2H), 7.99 (br, 1H), 7.83 (br, 1H), 7.77 (br, 1H), 7.61 (br, 2H), 7.53 (appears as poorly resolved dd, 2H), 7.44–7.38 (br, 1H), 7.30 (br, 2H), 7.20 (m, 1H), 7.03 (br, 2H), 6.95 (s, 1H), 6.83 (br, 1H), 2.45 (br, 6H), 0.41 (s, 9H). Broad peaks in the aromatic region appear to indicate the presence of dimerized or oligomerized forms of (bistrifluoromethylphenyl)ZrCl$_3$. In addition, one NMe$_2$ group (2.45 ppm) and one SiMe$_3$ group (0.41 ppm) per every two 2-bis(3',5'-trifluromethyl)-phenylindenyl entities appear to be coordinated to the metal. This material was used without further purification.

Metallocene 8
(2-(3',5'-Trifluoromethylphenyl)indenyl)(1-methyl-2-phenylindenyl)zirconium Dichloride Butyllithium (2.5 M in hexanes, 0.55 mL, 1.38 mmol) was added to the solution of 1-methyl-2-phenylindene (277 mg, 1.31 mmol)in diethyl ether (25 mL) at −78° C. via syringe. The resulting light yellow solution was allowed to warm to room temperature, stirred for an additional 15 min, and the ether was removed in vacuo to yield a white powdery solid which was combined with solid (2-(bis-3',5'-trifluoromethylphenyl)indenyl)zirconium trichloride. Me$_3$SiNMe$_2$ (695 mg, 1.31 mmol) and toluene (40 mL) at 0° C. The resulting dark green solution was allowed to warm to room temperature and stirred for 40 h during which time the color of the solution gradually turned lemon-yellow. The turbid solution was filtered through a glass frit packed with Celite and then evaporated to dryness. Orange crystals were obtained from a CH$_2$Cl$_2$ (5 mL)/pentane (5 mL) solution stored at −50° C. (200 mg, 28%) $^1$H NMR (20° C., CDCl$_3$, 500 MHz): δ 7.84 (s, 2H, br), 7.82 (s, 1H, br), 7.52 (t, 2H, J=7.5 Hz), 7.43 (m, 3H), 7.36 (m, 2H), 7.29 (m, 2H), 7.20 (t, 1H, J=6.0 Hz), 7.08 (q, 2H, J=7.0 Hz), 6.68 (d, 1H, J=2 Hz), 6.38 (d, 1H, J=2 Hz), 5.99 (s, 1H), 5.32 (s, ⅓ H, C H$_2$Cl$_2$), 2.53 (s, 3H). $^{13}$C {$^1$H} NMR (20° C., CDCl$_3$, 125 MHz): δ 135.48 (C), 133.20 (C), 132.23 (C), 132.20 (C), 131.62 (C—CF$_3$, $^2$J$_{C-F}$=34 Hz), 130.23 (C), 129.03 (CH), 128.61 (CH), 128.44 (C—H), 126.87 (C—H), 126.71 (C—H), 126.70 (C—H), 126.54 (C—H), 126.45 (C—H), 126.24 (C—H), 125.90 (C), 125.17 (C—H), 125.01 (C), 124.43 (C), 124.15 (C—H), 124.13 (C—H), 123.22 (CF$_3$, J$_{C-F}$=272 Hz), 121.70 (C—H, br), 102.09 (C—H, Cp), 101.20 (C—H, Cp), 98.51 (C—H, Cp), 12.39 (CH$_3$). Anal. Calcd (Found) for C$_{33}$H$_{22}$Cl$_2$F$_6$Zr×⅙.CH$_2$Cl$_2$: C 56.20 (56.11); H 3.18 (3.09).

Metallocene 9
(2-(3',5'-Trifluoromethylphenyl)indenyl)(1-methyl-2-(bis-3',5'-trifluoromethylphenyl)indenyl)zirconium Dichloride Butyllithium (2.5 M in hexanes, 0.40 mL, 1.00 mmol) was added to the solution of 2-(bis-3,5-trifluoromethylphenyl)indene (Ligand B) (328 mg, 0.958 mmol) in diethyl ether (30 mL) at −78° C. via syringe. The resulting light yellow solution was allowed to warm to room temperature, stirred for additional 2.5 h and the ether was removed in vacuo to yield a gray powdery solid, which was washed with pentane, filtered, and dried in vacuo. The solid was then combined with solid (2-(bis-3',5'-trifluoromethylphenyl)indenyl)zirconium trichloride. Me$_3$SiNMe$_2$ (508 mg, 0.958 mmol) and toluene (50 mL) and the reaction mixture was stirred for 40 h at room temperature. The turbid yellow solution was filtered through a glass frit packed with Celite and then evaporated to dryness. The resulting solid was extracted with CH$_2$Cl$_2$ (10 mL). The yellow methylene chloride solution was placed in a −50° C. freezer overnight and a yellow precipitate formed (100 mg, 13%). $^1$H NMR (20° C., C$_6$D$_6$, 500 MHz): δ 7.56 (s, 2H, br), 7.48 (s, 2H, br), 7.29 (d, 1H, J=8.5 Hz), 7.08 (m, 2H), 6.90 (m, 2H), 6.83 (t, 2H, J =7.0 Hz), 6.66 (t, 1H, J=7.5 Hz), 6.00 (d, 1H, J=2.5 Hz), 5.73 (d, 1H, J=2.5 Hz), 5.48 (s, 1H), 2.14 (s, 3H). $^{19}$F NMR (20° C., C$_6$D$_6$, 282 MHz): d 63.65 (s, 3F), 63.57 (s, 3F). $^{13}$C {$^1$H} NMR (20° C., CDCl$_3$, 125 MHz): δ 135.61 (C), 133.85 (C), 132.66 (C), 131.64 (C—CF$_3$, $^2$J$_{C-F}$=33 Hz), 131.44 ( C—CF$_3$, $^2$J$_{C-F}$=33 Hz), 130.78 (C), 129.03 (CH), 129.00 (CH), 127.85 (C), 126.79 (CH), 126.63 (CH), 126.57 (CH), 126.35 (CH), 125.91 (CH), 124.95 (CH), 124.74 (C), 124.59 (CH), 124.28 (CH), 123.50 (CF$_3$, J$_{C-F}$=273 Hz), 123.15 (CF$_3$, J$_{C-F}$=273 Hz), 122.83 (C), 122.09 (C), 121.89 (CH, br), 121.42 (CH, br), 118.74 (C), 103.28 (CH, Cp), 100.28 (CH, Cp), 99.57 (CH, Cp), 12.17 (CH$_3$). Anal. Calcd (Found) for C$_{35}$H$_{20}$Cl$_2$F$_{12}$Zr: C 50.61 (50.90); H 2.43 (2.72).

Metallocene 10
Bis(2-(Bis-3,5-tert-butyl-4-methoxyphenyl)indenyl) zirconium Dichloride A sample of 5.584 g (40 mmol) potassium carbonate and 6.3 mL (100 mmol) iodomethane were reacted with 2.554 g (10 mmol) bis-3,5-terf-butyl-4-hydroxybenzoic acid and heated to 45° C. for 30 h. Flash chromatography of the crude product on silica gel with 7.5% ether in hexanes then recrystallization from hexanes at −20° C. yielded methyl-bis-3,5-tert-butyl4-methoxybenzoate. Yield: 2.213 g (7.95 mmol, 80%). $^1$H NMR (CDCl$_3$): d 1.42 (s, 18H), 3.68 (s, 3H), 3.87 (s, 3H), 7.93 (s, 2H); $^{13}$C NMR (CDCl$_3$): d 31.91, 35.86, 51.93, 64.40, 124.35, 128.24, 144.01, 163.84, 167.45. The methyl ester (8 mmol) was dissolved in 65 mL of THF in an addition funnel and added to a solution of the di-Grignard of o-xylylenedichloride solution at −78° C. over approx. 60 minutes, consistently maintaining the temperature below −70° C. during the addition. The reaction mixture was warmed to 0° C. in 1–2 h and 80 mL distilled water was added through the addition funnel in 15–30 minutes. After the reaction mixture was allowed to warm to room temperature the THF was removed completely from the reaction mixture. The remaining suspension was acidified to pH=1 and extracted with methylene chloride. The combined organic layers were dried over magnesium sulfate and stirred with 0.300 g (1.57 mmol) para-toluenesulfonic acid monohydrate for 1 h at room temperature. After extraction with distilled water and drying over magnesium sulfate, the crude indene product was transferred to silica gel and purified by flash chromatography. Yield 2.346 g (7.01 mmol, 87%). $^1$H NMR (CD$_2$Cl$_2$): δ 1.47 (s, 18H), 3.71 (s, 3H), 3.79 (s, 2H), 7.14 (s, 1H), 7.15 (td, J=7.0 Hz, J=0.8 Hz), 1H), 7.25 (t, J=7.5 Hz, 1H), 7.37 (d, J=7.5 Hz, 1H), 7.62 (d, J=7.5 Hz, 1H), 7.54 (s, 2H); $^{13}$C NMR (CD$_2$Cl$_2$): δ 32.18, 36.09, 39.47, 64.65, 120.88, 123.89, 124.41, 124.68, 125.36, 126.87, 130.67, 143.53, 144.24, 146.05, 147.55, 159.94.

A sample of 1.5 mmol of the 2-(bis-3,5-tert-butyl-4-methoxyphenyl)indene product was dissolved in 50 mL of diethylether. The solution was cooled down to 0° C. and 0.6 mL (1.5 mmol) n-butyllithium (2.5 M in hexanes) was added dropwise via syringe. The cooling bath was removed and the mixture was stirred at ambient temperature for 10 h and evacuated to dryness. Zirconium tetrachloride, 175 mg (0.75 mmol), and 100 mL toluene was added and the reaction mixture stirred vigorously at 25° C. for 3 days. Toluene was removed in vacuo and 50 mL methylene chloride added. The suspension was filtered over celite through a Schlenk-frit under argon and washed with methylene chloride until the filtered liquid remained colorless. The resulting clear solution's volume was reduced to ¼ to ⅕ and a layer of pentane, hexanes or diethylether was applied carefully. The layered solution was stored at −80° C. for crystallization of the product. Yield: 293 mg (0.353 mmol, 36%), yellow solid. $^1$H NMR (CD$_2$Cl$_2$): δ 1.56 (s, 36H), 3.82 (s, 6H), ), 6.64–6.68 (m, 4H), 6.72 (s, 4H), 6.98–7.01 (m, 4H), 7.63 (s, 4H); $^{13}$C NMR (CD$_2$Cl$_2$): δ 32.16, 36.13, 64.67, 104.50, 124.32, 125.48, 126.11, 126.40, 127.03, 129.51, 144.65, 160.45. Anal. Calcd for C$_{48}$H$_{58}$Cl$_2$O$_2$Zr: C, 69.54; H, 7.05. Found: C, 69.41; H, 7.24.

Metallocenes 11 and 12

Bis(2-(bis-3,5-tert-butylphenyl)indenyl)zirconium dichloride (Metallocene 11) and Bis(2-(bis-3,5-trimethylsilyllphenyl)indenyl)zirconium dichloride (Metallocene 12) were obtained from SRI International.

General Polymerization Procedures

Ethylene-Hexene Copolymerization

A portion of metallocene was dissolved in 25 mL of toluene in the N$_2$ dry box. Methylaluminoxane (MAO) (Akzo Type 4 modified MAO) was dissolved in 35 mL of 1-hexene. The MAO solution was loaded into a 150 mL 2-ended injection tube. Meanwhile, a 300 mL stainless steel Parr reactor was evacuated to 100 mtorr and refilled with Ar. The reactor was flushed three times with 50 psig (450 kPa) Ar and then 129 psig (990 kPa) ethylene. The MAO solution was introduced to the reactor and was allowed to equilibrate with under the desired head pressure of ethylene for 30 min. 1-Hexene (3.2 mL) and an aliquot of metallocene stock solution (1.8 mL) was introduced to a 25 mL 2-ended injection tube. The ethylene feed was disconnected from the reactor and the pressure was vented by 10 psi (70 kPa). The metallocene solution was injected under the desired head pressure of ethylene to start the reaction. The ethylene feed was immediately reconnected to the reactor. The temperature was controlled at 18° C. throughout the reaction via an ethylene glycol/water cooling loop. The reaction was quenched with methanol injected under Ar pressure after one hour. The reactor was vented and the copolymer was collected and stirred with acidified methanol overnight. The copolymer was then rinsed with methanol and dried to constant weight in a vacuum oven at 40° C.

Ethylene Homopolymerization

The homopolymerization procedure was identical to that employed in copolymerizations. However, hexane was substituted for 1-hexene as the reaction solvent.

Ethylene-1-Hexene Copolymer Characterization

Number and weight average molecular weights (M$_n$ and M$_w$) were obtained using a Waters 150C High Temperature Chromatograph. Samples were run in 1,2,4-trichlorobenzene at 139° C. using two Polymer Laboratories PL GEL Mixed-B columns at a flow rate of 1 mL/min. Molecular weights are reported versus high density polyethylene standards. Viscosities were measured at 130° C. in tetralin.

Copolymer composition and monomer sequence distribution were determined using $^{13}$C NMR spectroscopy. Copolymer samples (180–300 mg) were dissolved in 2.5 mL of o-dichlorobenzene/10 vol. % benzene-d$_6$ in 10 mm tubes. $^{13}$C NMR spectra were recorded at 75.425 MHz on a Varian UI 300 spectrometer at 100° C. using 10 mm sample tubes. Samples were prepared in 1,2-dichlorobenzene containing about 0.5 mL d$_6$benzene and approximately 5 mg of chronium(III) acetylacetonate to reduce T1 spin relaxation times. Spectra were acquired using pulse repetition intervals of 5 s and gated proton decoupling.

The monomer feed ratio (X$_e$/X$_h$) was calculated using an equation reported in Spitz et. al., *Eur. Polym. J.*, 1797, v.85, pp 441–4 for the solubility of ethylene in 1-hexene. Determination of copolymer composition (mol %E) and sequence distribution were carried out using the method of Cheng (*Polym. Bull.*, 1991, v.26, 325). The triad distribution for commercial elastomers (ENGAGE™ 8200 and EXACT™ 4033) were calculated by methods outlined by Randall (*Macromol. Sci. Rev. Macromol. Chem. Phys.*, 1989, v.C29, pp 201–317).

The glass transition, melting points and heats of fusion were determined by differential scanning calorimetry using a Perkin-Elmer DSC-7. The DSC scans were obtained by first heating copolymer samples to 200° C. for 10 min, cooling them to 20° C. at 20° C. per minute, aging them at room temperature for 24 h and then reheating from 0° C. to 200° C. at 20° C./min. All DSC values in the tables are reheat values. Scans to determine the glass transition temperature were obtained by cooling the sample to −150° C. and then heating to 0° C. at 40° C./min. Two samples of each polymer were run to ensure that the DSC measurements were reproducible. Density was measured by a gradient column technique in which a piece of molded specimen was allowed to sink to an equilibrium level in an isopropyl alcohol/water column. The float level of the specimen was compared to the float level of glass beads of known density.

Tensile and recovery tests were performed with ASTM D-1708 dumbbell specimens (0.9 inch gauge length) die cut from compression molded sheets. Crosshead separation rate was 25.4 cm/min for the three cycle 100% strain test and 51 cm/min for all other tests. Tensile modulus of elasticity was determined as the tangent slope at lowest strain. Elongation after break (percent elongation following break) was measured from benchmarks as immediate set of the center 10 mm section of the specimen. The three cycle 100% strain test was performed by elongating the specimen to twice the original gauge length in three successive cycles of extension and recovery, with 30 seconds hold at 100% elongation and 60 seconds hold after crosshead recovery between cycles. In this test, the cumulative set after the first two cycles is measured as the elongation at which stress (or force) exceeds the baseline on the third cycle.

Dynamic mechanical analysis (DMA) was performed with a Seiko Instruments DMS 200 apparatus in tension mode at a frequency of 1 Hz. Temperature was scanned from −150° C. to +175° C. at a rate of 2° C./min. Rectangular strip specimens were prepared by trimming the end tabs of type D1708 specimens (the same specimens prepared for tensile and recovery tests). The center 1.0 cm length was used as the gauge length between grips in the DMA apparatus. Specimen width was 0.5 cm and thickness was 0.05–0.10 cm.

EXAMPLES 1–18

Runs A–V

The copolymerization of ethylene and 1-hexene was carried out with metallocenes 1, 2, 3, 4, 5, 9 and 10 as described above. Polymerization conditions are summarized in Table 1. The data and characteristics of the resulting polymers are reported in Table 2.

As indicated in Table 2, Comparative Runs A–E, carried out with bridged metallocene 1 yields random ethylene/hexene copolymers. Polymers made with this metallocene containing 54–69 mol % ethylene are amorphous, exhibiting no melting point by DSC analysis as indicated by "none" under the melt range and T$_m$ columns. In contrast, metallocene 4 of the present invention yields polymers containing 55–70% ethylene with melting points ranging from 26–130° C.

Reactivity ratios, r$_E$ and r$_H$, for ethyl and hexene insertion were calculated from diad distribution in $^{13}$C NMR data. For copolymers made from catalyst 3 incorporating hafnium as the transition metal, the $r_E$ and $r_H$ are 2.5±0.2 and 0.24±0.03, respectively. These values compare to typical $r_E$'s of 5–18 and $r_H$'s of 0.03 to 0.18 for polymers made from other catalysts reported in Table 2. Thus, hafnium-containing metallocene catalysts preferentially insert 1-hexene to a greater proportion than observed in comparable zirconium-containing metallocene catalysts.

The properties of the ethylene/hexene copolymers of Examples 5 and 6 are compared to representative other comparable polyolefin elastomers and reported in Table 3. Comparative Run T is a commercial Ethylene/Octene Elastomer obtained from Dow (Engage 8200™), Comparative Run U is an Ethylene/Butene Elastomer obtained from Exxon (Exact 4033™), and Comparative Run V is a polypropylene elastomer as described in Waymouth et al. U.S. Pat. No. 5,594,080.

TABLE 1

Polymerization Conditions For Ethylene-1-Hexene Copolymers

| Ex. (Run) | Catalyst[a] | $t^b$ (min) | $T^c$ (° C.) | $[Zr]^f$ (mM) | MAO $(mg)^d$ | $P_e^e$ (kPa) | $V_{hxe}^f$ (mL) | $V_{hxa}^g$ (mL) | $V_{total}^h$ (mL) |
|---|---|---|---|---|---|---|---|---|---|
| A | 1 | 35 | 19 | 1.0 | 100 | 380 | 40 | 0 | 40 |
| B | 1 | 11 | 18 | 1.0 | 100 | 610 | 40 | 0 | 40 |
| C | 1 | 15 | 19 | 0.5 | 100 | 770 | 40 | 0 | 40 |
| D | 1 | 15 | 18 | 0.5 | 100 | 1060 | 40 | 0 | 40 |
| E | 1 | 7.5 | 18 | 0.5 | 100 | 1240 | 40 | 0 | 40 |
| F | 2 | 30 | 18 | 1.6 | 100 | 784 | 40 | 0 | 40 |
| G | 2 | 30 | 18 | 1.6 | 100 | 984 | 40 | 0 | 40 |
| H | 2 | 30 | 18 | 1.6 | 100 | 1140 | 40 | 0 | 40 |
| J | 3 | 30 | 18 | 6.3 | 100 | 1000 | 39 | 0 | 40 |
| K | 3 | 30 | 18 | 6.3 | 100 | 1210 | 39 | 0 | 40 |
| L | 3 | 30 | 18 | 6.3 | 100 | 1410 | 39 | 0 | 40 |
| M | 3 | 30 | 18 | 6.3 | 100 | 1830 | 39 | 0 | 40 |
| N | 4 | 180 | 17 | 6.3 | 100 | 470 | 39 | 0 | 40 |
| 1 | 4 | 120 | 18 | 6.3 | 100 | 640 | 39 | 0 | 40 |
| 2 | 4 | 180 | 18 | 6.3 | 100 | 991 | 39 | 0 | 40 |
| 3 | 4 | 180 | 18 | 6.3 | 100 | 1420 | 39 | 0 | 40 |
| 4 | 4 | 180 | 18 | 6.3 | 100 | 1210 | 39 | 0 | 40 |
| 5 | 4 | 180 | 18 | 13 | 200 | 1240 | 77 | 0 | 80 |
| 6 | 4 | 90 | 18 | 13 | 200 | 1450 | 40 | 38 | 80 |
| 7 | 4 | 90 | 18 | 13 | 200 | 1830 | 77 | 0 | 80 |
| 8 | 4 | 60 | 20 | 13 | 200 | 1420 | 20 | 59 | 80 |
| 9 | 4 | 60 | 18 | 6.3 | 100 | 970 | 0 | 40 | 40 |
| 10 | 9 | 30 | 18 | 6.3 | 100 | 956 | 39 | 0 | 40 |
| 11 | 9 | 30 | 18 | 6.3 | 100 | 1480 | 39 | 0 | 40 |
| O | 10 | 30 | 18 | 6.3 | 100 | 784 | 39 | 0 | 40 |
| 12 | 10 | 30 | 18 | 6.3 | 100 | 1030 | 39 | 0 | 40 |
| 13 | 10 | 30 | 18 | 6.3 | 100 | 1230 | 39 | 0 | 40 |
| P | 11 | 30 | 18 | 3.0 | 100 | 984 | 40 | 0 | 40 |
| Q | 11 | 30 | 18 | 3.0 | 100 | 1140 | 40 | 0 | 40 |
| 14 | 11 | 30 | 18 | 3.0 | 100 | 1470 | 40 | 0 | 40 |
| R | 12 | 30 | 18 | 2.4 | 100 | 811 | 40 | 0 | 40 |
| S | 12 | 30 | 18 | 2.4 | 100 | 977 | 40 | 0 | 40 |
| 15 | 12 | 30 | 18 | 2.4 | 100 | 1340 | 40 | 0 | 40 |
| 16 | $2/H_2$ | 45 | 19 | 13 | 200 | 1400 | 20 | 58 | 80 |
| 17 | $2/H_2$ | 45 | 18 | 13 | 200 | 1400 | 20 | 58 | 80 |
| 18 | $2/H_2$ | 45 | 18 | 13 | 200 | 1400 | 20 | 58 | 80 |

[a]1 = ethylenebisindenylzirconium dichloride (bridged);
2 = bis(2-phenylindenyl)zirconium dichloride;
3 = bis(2-phenylindenyl)hafnium dichloride;
4 = bis(2-(3,5-trifluoromethylphenyl)indenyl)zirconium dichloride;
9 = (2-(3,5-trifluoromethylphenyl)indenyl)(1-methyl-2-(3,5-trifluoromethylphenyl)indenyl)zirconium dichloride (four rotational states);
10 = bis(2-(3,5-tert-butyl-4-methoxyphenyl)indenyl)zirconium dichloride;
11 = bis(2-(3,5-trimethylsilylphenyl)indenyl)zirconium dichloride;
12 = bis(2-(3,5-tert-butylphenyl)indenyl)zirconium dichloride,
[b]t = polymerization time.
[c]T = polymerization temperature
[d]Amount of MAO (Akzo Type 4) used for the reaction.
[e]$P_e$ = ethylene pressure (absolute).
[f]$V_{Hxe}$ = volume of 1-hexene used for the polymerization.
[g]$V_{Hxa}$ = volume of hexanes diluent used for the reaction.
[h]$V_{Total}$ = total volume used for the polymerization, $V_{Total} - (V_{Hexene} + V_{Hexane})$ = volume of metallocene stock solution (in toluene) used.
[f]Zirconium concentration in micromoles.

TABLE 2

Property data for Ethylene-1-Hexene Copolymers

| Ex. (Run) | Catalyst[a] | Prod.[b] (× 10⁻⁴) | % E[c] | $T_g^d$ (° C.) | Melt Range (° C.) | $T_m$ (° C.) | $\Delta H_f$ (J/g) | $M_w^e$ (× 10⁻³) | PDI[e] |
|---|---|---|---|---|---|---|---|---|---|
| A | 1 | 11.9 | 56 | −72 | none | none | 0 | 53 | 2.2 |
| B | 1 | 97.2 | 65 | −76 | none | none | 0 | 52 | 2.1 |
| C | 1 | 96.6 | 69 | −75 | none | none | 0 | 61 | 2.2 |
| D | 1 | 85.2 | 78 | −77 | 37–45 | 43 | 0.3 | 75 | 2.4 |
| E | 1 | 209.2 | 83 | −74 | 3343 | 40 | 4.7 | 71 | 2.2 |
| F | 2 | 4.2 | 54 | −69 | none | none | 0 | 1176 | 3.2 |
| G | 2 | 5.7 | 60 | −70 | none | none | 0 | 1353 | 5.5 |
| H | 2 | 7.4 | 65 | −74 | none | none | 0 | 1474 | 7.4 |
| J | 3 | 2.0 | 41 | −61 | none | none | 0 | 1293 | 3.2 |
| K | 3 | 2.4 | 44 | −67 | none | none | 0 | 1508 | 2.5 |
| L | 3 | 3.0 | 49 | −65 | none | none | 0 | 1793 | 2.8 |
| M | 3 | 0.96 | 63 | −69 | 30–50 | 40 | 1.0 | 1287 | 4.8 |
| N | 4 | 0.24 | 42 | −73 | none | none | 0 | 554 | 7.4 |
| 1 | 4 | 0.30 | 55 | −67 | 26–126 | 39, 116 | 2.7 | 691 | 6.3 |
| 2 | 4 | 0.30 | 66 | −72 | 28–130 | 40, 120 | 8.0 | 994 | 7.6 |
| 3 | 4 | 1.1 | 71 | nd[f] | 27–80, 89–127 | 38, 121 | 4.2 | 1076 | 9.0 |
| 4 | 4 | 0.4 | 72 | −72 | 27–128 | 42, 118 | 6.6 | 1404 | 5.8 |
| 5 | 4 | 0.30 | 73 | −72 | 23–130 | 37, 119 | 16 | 826 | 6.3 |

TABLE 2-continued

Property data for Ethylene-1-Hexene Copolymers

| Ex. (Run) | Catalyst[a] | Prod.[b] (× 10⁻⁴) | % E[c] | $T_g$[d] (° C.) | Melt Range (° C.) | $T_m$ (° C.) | $\Delta H_f$ (J/g) | $M_w$[e] (× 10⁻³) | PDI[e] |
|---|---|---|---|---|---|---|---|---|---|
| 6 | 4 | 1.4 | 80 | −70 | 16–116 | 25, 86 | 15.7 | 1052 | 5.5 |
| 7 | 4 | 1.1 | 79 | nm[g] | 25–125 | 31, 45, 80, 114 | 8.8 | nm[g] | nm[g] |
| 8 | 4 | 2.6 | 90 | −59 | 11–117 | 20, 40, 105 | 31 | 1221 | 6.2 |
| 9 | 4 | 1.5 | 100 | nd[f] | 100–145 | 133 | 136 | 1534 | 4.7 |
| 10 | 9[h] | 0.60 | 76 | −71 | 40–68, 92 120 | 44, 113 | 1.9 | 700 | 4.8 |
| 11 | 9[h] | 1.2 | 84 | −72 | 20–67, 78 114 | 28, 107 | 4.0 | 901 | 5.8 |
| O | 10 | 0.9 | 51 | nd | none | none | 0 | 1193 | 4.1 |
| 12 | 10 | 1.0 | 57 | −74 | 34–127 | 117 | 4.0 | 1335 | 7.8 |
| 13 | 10 | 1.2 | 63 | −76 | 29–135 | 117 | 5.2 | 1758 | 7.9 |
| P | 11 | 1.5 | 53 | −86 | none | none | 0 | 1494 | 3.7 |
| Q | 11 | 2.0 | 58 | −92 | none | none- | 0 | 1680 | 6.8 |
| 14 | 11 | 3.2 | 66 | −91 | 29–80, 100–128 | 40, 120 | 0.8 | 1739 | 4.8 |
| R | 12 | 1.8 | 44 | −65 | none | none | 0 | 1019 | 3.3 |
| S | 12 | 1.8 | 55 | −68 | none | none | 0 | 1180 | 4.0 |
| 15 | 12 | 1.4 | 62 | −72 | 24–120 | 35, 120 | 2.2 | 1369 | 3.9 |
| T | NGAGE ™ | — | 87 | −64 | 20–70 | 66 | 36 | 77 | 2.4 |
| U | EXACT ™ | — | 85 | −64 | 20–70 | 64 | 50 | nm[g] | nm[g] |

[a]1 = ethylenebisindenylzirconium dichloride (bridged);
2 = bis(2-phenylindenyl)zirconium dichloride;
3 = bis(2-phenylindenyl)hafnium dichloride;
4 = bis(2-(3,5-trifluoromethylphenyl)indenyl)zirconium dichloride;
9 = (2-(3,5-trifluoromethylphenyl)indenyl)(1-methyl-2-(3,5-trifluoromethylphenyl)indenyl) zirconium dichloride (four rotational states);
10 = bis(2-(3,5-tert-butyl-4-methoxyphenyl)indenyl)zirconium dichloride,
11 = bis(2-(3,5-trimethylsilylphenyl)indenyl)zirconium dichloride;
12 = bis(2-(3,5-tert-butylphenyl)indenyl)zirconium dichloride,
[b]Prod. = productivity measured in kg of polymer produced per mol of metal per hour.
[c]Mole % E determined by ¹³C NMR spectroscopy.
[d]Half Cp extrapolated.
[e]Determined by high temperature GPC.
[f]nd = not detected.
[g]nm = not measured
[h]Catalyst 9 exhibits four rotational symmetry states (FIG. 2).

TABLE 3

Mechanical Properties of Polyolefin Elastomers

| Polymer | Ex. 5 | Ex. 6 | Ex. 8 | Run T | Run U | Run V |
|---|---|---|---|---|---|---|
|  |  |  |  | Engage 8200 | Exact 4033 | Polypropylene 37% m4 |
| Comonomer | Hexene | Hexene | Hexene | Octene | Butene | None |
| Mole % Ethylene | 73 | 80 | 89 | 87 | 89 | 0 |
| PE Melt Index | nd | nd | nd | 5.0 | 0.8 |  |
| Mn (× 10³) | 130 | 191 | 196 | 32.7 |  |  |
| Mw (× 10³) | 826 | 1052 | 1221 | 77.4 | nd | 386 |
| Mw/Mn (PDI) | 6.3 | 5.5 | 6.2 | 2.4 |  |  |
| $T_m$ range (° C.) | 23–130 | 16–116 | 11–117 | 20–70 | 20–70 | 40–160 |
| $T_m$ peak (° C.) | 119 | 25,86 | 20–105 | 66 | 64 | 148 |
| $\Delta H_f$ (J/g) | 16.2 | 15.6 | 26 | 36 | 50 | — |
| $T_g$ (° C.)[a] | −72 | −70 | −59 | −64 | −56 | — |
| Density (g/cc) | 0.8682 | 0.8694 | 0.8819 | 0.87 | 0.88 | 0.8663 |
| Tensile Strength (MPa) | 3.6 | 4.2 | 8.8 | 9.6 | 16.9 | 12.3 |
| Tensile Modulus (MPa) | 2.9 | 4.0 | 10.3 | 6.9 | 12.3 | 8.9 |
| Elongation at Break (%) | 565 ± 62 | 428 | 360 | 1130 | 750 | 830 |
| Elongation after Break (%) | 90 ± 17 | 26 | 57 | 300 | 210 | 34 |
| 100% Elongation 3 Cycle Test: |  |  |  |  |  |  |
| % stress relaxation, 30 sec, 1st cycle | 33 | 17 | 17 | 23 | 23 | 39 |

TABLE 3-continued

Mechanical Properties of Polyolefin Elastomers

| Polymer | Ex. 5 | Ex. 6 | Ex. 8 | Run T | Run U | Run V |
|---|---|---|---|---|---|---|
| % retained force, 2nd cycle | 24 | 41 | 29 | 28 | 20 | 29 |
| % set, cumulative Stress Relaxation Test | 19 | 13 | 13 | 13 | 11 | 7 |
| 50% elongation, 5 min | 51 | 33 | 25 | 28 | 28 | 48 |

[a]Determined by Dynamic Mechanical Analysis (DMA).

As evident from Table 3, the polyolefin elastomers of Examples 5, 6 and 8 have a similar density and comparable elastomeric properties. However, the copolymer elastomers of Example 5 and 6 have a particularly useful combination of properties that includes a low glass transition temperature (Tg=−70° C.) and melting ranges that extend to 130° C. The copolymers of Example 5 and Comparative Runs T and U illustrate that while the heat of fusion from Example 5 is lower ($\Delta H_f$ (J/g)=16.2 vs. 36 and 50 for Engage and Exact), the melting point of the copolymer of Example 5 is 119° C. It is unexpected that this high melting point is achieved at a much lower mol % ethylene (73 mol % versus 87 or 89 mol % for Engage and Exact, respectively).

It is evident that the polymers of the present invention, and the polymerization catalysts and processes by which the polymers are produced will have wide applicability in industry, inter alia, as elastomers having higher melting points than currently available elastomers, as thermoplastic materials, and as components for blending with other polyolefins for predetermined selected properties, such as raising the melting point of the blend. As seen in Table 3 and the accompanying discussion, typical polymers of this invention, while they have degrees of crystallinity lower than (Examples 5,6,8), or similar to (Examples 20,21) that of Dow's Engage 8200™ and EXXON's 4033™, they have a broader melting point range that extends to higher temperatures, e.g., to 130° C., and above.

Solvent Extraction

The compositional homogeneity of copolymers of this invention was investigated by extracting the copolymers in boiling solvents such as ether and hexanes. Copolymers were extracted sequentially into solvents of increasing boiling point to separate components of different molecular weight and crystallinity. Diethyl ether, pentane, THF, hexanes, cyclohexane, and heptane were used. The copolymer (1–2 g) was placed in an extraction thimble and loaded into a Kumigawa extraction apparatus. The polymer was extracted into refluxing solvent for 24–48 h. The solvent soluble material was precipitated in stirring methanol and then dried in a vacuum oven at 40° C. The solvent-insoluble material was dried in the vacuum oven while still in the extraction thimble. The process was then repeated on the solvent insoluble material with higher boiling solvents until all the material dissolved. For the fractionation experiments listed in Table 9, the heptane extraction was performed first. The heptane soluble material was then extracted with diethyl ether.

The results of a fractionation experiments on the copolymer samples of Example 2 and 3 are reported in Table 4. A portion of ethylene/hexene copolymer produced in Examples 2, and 3 containing 66 and 71 mole percent ethylene units, respectively, were fractionated with refluxing ether and hexanes. A sample of copolymer was extracted into refluxing ether and the resulting insoluble component then was extracted with refluxing hexanes. The results shown in Table 4 demonstrate that the composition distribution for fractions of differing crytallinities is narrow and within 8 mole % of the mean composition distribution.

TABLE 4

Solvent Fractionation of Ethylene/Hexene Copolymer

| Example | Sample | % Wt | % E[a] | $T_m$, ° C. | Melt Range, ° C |
|---|---|---|---|---|---|
| 2 | Whole | 100 | 66 | 63, 114 | 61–81, 82–124 |
|   | ES[b] | 16 | 59 | 42 | 35–50 |
|   | EI | 84 | 72 | 41, 118 | 29–126 |
|   | EI/HxS[c] | 80 | 69 | 45 | 25–85 |
| 3 | Whole | 100 | 71 | 39, 119 | 29–75, 76–126 |
|   | ES[b] | 23 | 63 | 35 | 30–43 |
|   | EI[c] | 77 | 75 | 35, 119 | 24–129 |
|   | EI/HxS[c] | 64 | 72 | 34, 119 | 27–126 |
|   | HxI[e] | 13 | 78 | 35, 59, 117 | 24–128 |

[a]determined by solution $^{13}$C NMR.
[b]ES = diethylether soluble.
[c]EI/HxS = diethylether insoluble/hexane soluble.
[d]HxI = hexane insoluble.

The mole fraction of ethylene in the various fractions of the copolymer were all within 10% of the mean mole percent ethylene of the copolymer sample, indicating that these materials had a narrow composition distribution. Solvent fractionation experiments were performed on a sample of ethylene/1-hexene copolymer (Example 7) containing 79 mole percent ethylene prepared with Catalyst 4. The copolymer was extracted for 48 hours with ether, and the ether-insoluble portion then was extracted with pentane for another 48 hours. This procedure was repeated using tetrahydrofuran (THF), hexanes, cyclohexane, and heptane. The results are shown in Table 5. The ethylene content of the fractions lie within 11 mole % of that observed for the whole polymer, although the crystallinities for the fractions as reflected in the DSC data vary widely.

TABLE 5

Solvent Fractionation Of Ethylene-1-Hexene Copolymer

| Fraction | Weight % | mol % E | $T_m$ (range) (° C.) | $T_m$ (peaks) (° C.) | $\Delta H_f$ (J/g) |
|---|---|---|---|---|---|
| Ex. 7, Whole | 100 | 79 | 25–125 | 31, 45, 80, 114 | 8.8 |
| Ether Soluble | 23 | 71 | 28–46 | 36 | 0.2 |
| Pentane Soluble | 6 | 75 | 28–60 | 37 | 0.8 |
| THF Soluble | 38 | 77 | 26–87, 99–112 | 33, 112 | 3.7, 0.1 |

TABLE 5-continued

Solvent Fractionation Of Ethylene-1-Hexene Copolymer

| Fraction | Weight % | mol % E | $T_m$ (range) (° C.) | $T_m$ (peaks) (° C.) | $\Delta H_f$ (J/g) |
|---|---|---|---|---|---|
| Hexane Soluble | 17 | 80 | 23–123 | 34, 113 | 6.6 |
| Cyclohexane Soluble | 11 | 89 | 22–120 | 38, 84 | 23.7 |
| Heptane Soluble | 5 | 91 | 24–118 | 33, 80, 104 | 17.9 |

Supercritical Fluid Fractionation

The solubility of a polymer in a typical organic solvent depends on the identity of the solvent and temperature. Higher molecular weight and more highly crystalline components tend to dissolve at reflux in higher boiling solvents. Supercritical fluids have an added advantage in that the solubility of the polymer can be tuned by the pressure of the system. As pressure is increased, components higher in molecular weight and crystallinity will dissolve. This unique feature of supercritical fluids can be exploited to separate polyolefin homo- and copolymers into well-defined fractions. Supercritical fluid fractionation techniques have been successfully applied to the fractionation of linear low density polyethylenes according to molecular weight and degree of short chain branching.

An ethylene-1-hexene copolymer containing 90 mol %E (See Example 19, below) was fractionated using a supercritical fluid extraction technique. Fractionation of the copolymer using supercritical propane was performed as follows: The copolymer sample was cut into small pieces and distributed in the fractionation chamber over surface area enhancing packing. Irganox 1010' (a phenolic antioxidant stabilizer, Ciba) was added to prevent degradation of the copolymer during the experiment. At a temperature above the melting point of the copolymer, supercritical propane was used to extract the sample over an increasing pressure profile ranging from 2000 psi–10,000 psi (14 MPa to 70 MPa). This procedure was expected to fractionate the material by molecular weight. This method involved extracting the copolymer into supercritical propane at increasing pressures (2000–10000 psi; 14–70 MPa) while maintaining a constant temperature (200° C.)in the extraction chamber. Because the fractionation was run above the highest peak melting temperature of the copolymer, fractionation was expected to occur strictly according to molecular weight.

Ethylene-1-hexene copolymer fractions collected according to this fractionation method exhibited very consistent ethylene contents (mol %E=88±3). The DSC profiles of all the fractions exhibited broad, bimodal melting transitions. The heats of fusion measured by DSC were similar for all fractions ($\Delta H_f$=8–14.5 J/g). The average molecular weights ($M_v$) of representative fractions were calculated from the intrinsic viscosities of the materials. The molecular weight tracked with the pressure of the supercritical fluid used to extract the copolymer ($M_v$=55,000–880,000). The Results are shown in Table 6

TABLE 6

Supercritical Fluid Fractionation Of Ethylene-1-Hexene Copolymer

| Propane Pressure (psi) | wt. % Collected | mol % E[a] | $T_m$ (° C.) (range) | $T_m$ (peaks) (° C.) | $\Delta H_f$[b] (J/g) | $\Delta H_f$ (Total) | $M_v$[c] (× $10^{-3}$) |
|---|---|---|---|---|---|---|---|
| 2000 (14 MPa) | 5.3 | 89 ± 1 | 31–73 86–143 | 39,48 120, 132 | 3.1 5.1 | 8.2 | 55 |
| 3000 (21 MPa) | 9.7 | 88 ± 2 | 23–78 96–122 | 32, 48 116 | 12.1 2.4 | 14.5 | |
| 4000 (28 MPa) | 13.5 | 88 ± 1 | 24–76 87–122 | 32, 48 113 | 10.1 2.5 | 12.6 | |
| 5000 (35 MPa) | 7.9 | 89 ± 1 | 25–73 81–122 | 32, 47 114 | 8.6 2.3 | 10.9 | 180 |
| 6000 (41 MPa) | 9.4 | 88 ± 1 | 24–76 77–122 | 33, 48 114 | 9.3 3.0 | 12.3 | |
| 7000 (48 MPa) | 8.2 | 88 ± 1 | 25–75 79–121 | 33, 48 112 | 9.4 2.8 | 12.2 | |
| 8000 (55 MPa) | | 88 ± 2 | 25–76 80–120 | 33, 47 112 | 8.9 2.0 | 10.9 | |
| 9000 (62 MPa) | 6.3 | 88 ± 3 | 26–73 85–120 | 32, 48 112 | 9.5 2.3 | 11.8 | |
| 10,000 (70 MPa) | 7.1 | 88 ± 3 | 23–77 80–120 | 32, 47 112 | 10.1 2.6 | 12.6 | |
| Insoluble Material | 23.2 | 87 ± 2 | 24–72 82–121 | 33, 48 112 | 11.4 1.8 | 13.2 | 880 |
| Whole[d] | 100 | 90 | 24–86 90–122 | 33, 44 114 | 10.3 5.7 | 16.0 | |

[a]Calculated by $^{13}$C NMR.
[b]The total heat of fusion is divided into components which correspond to the low and high temperature melting ranges.
[c]Determined from intrinsic Viscosity data.
[d]Data for the unfractionated copolymer.

EXAMPLES 19–21

Since some of the elastomeric properties exhibited in some of the copolymers of this invention may be due to high molecular weight of the materials, copolymerizations were performed in the presence of hydrogen which will lower polymer molecular weight. Three polymerizations were performed under identical conditions in which two were carried out in the presence of hydrogen The polymerizations were conducted to prepare ethylene-1-hexene copolymers containing 10 mol % hexene in the presence of hydrogen for molecular weight control. Polymerizations were conducted as described above using Catalyst 4 with MAO except that in Examples 20 and 21, 2.5 mmol and 5.0 mmol of hydrogen were added to the batch polymerization reactor, respectively. Properties of the resulting copolymers are shown in Tables 7 and 8. Since the concentration of hydrogen in the batch reactor decreased during the polymerization, the polydispersities were high since polymers of differing molecular weights will be formed as the hydrogen concentration decreases. Addition of hydrogen produced products which were plastomers rather than elastomers as evidenced by a substantial increase in tensile modulus. Solvent extraction of the products of Examples 19–21 were performed using the method described above. Results are shown in Table 9. Again, composition distribution among the solvent fractions is narrow within ±10%.

As expected, the molecular weights of the copolymers were lowered dramatically when hydrogen was introduced to the system. The polydispersities of the copolymers were higher for materials prepared in the presence of hydrogen. The melting transitions measured by DSC spanned a comparable range for the three copolymers ($T_m$=20–127° C.), however, the heats of fusion were significantly different. The crystallinity of the copolymers increased substantially as the amount of hydrogen in the system increased.

The high temperature component of the melting transition became sharper for reactions carried out in the presence of larger amounts of hydrogen as shown in FIG. 3. Trace a) is with no $H_2$ added (Ex. 19); Trace b) has 2.5 mmol $H_2$ (Ex. 20), and Trace c) has 5.0 mmol $H_2$ added (Ex. 21).

TABLE 7

Polymerization In the Presence Of Hydrogen[a]

| Ex. | $H_2$ (mmol)[b] | % E[c] | Melt Range (° C.) | $T_m$ (° C.) | $\Delta H_f$ (J/g) | $M_n^d$ (× $10^{-3}$) | $M_w^d$ (× $10^{-3}$) | PDI[e] | Density | Tg (° C.) |
|---|---|---|---|---|---|---|---|---|---|---|
| 19 | 0 | 90 | 24–86, 90–122 | 33, 44, 114 | 16.0 | nd | nd | nd | 0.8819 | nd |
| 20 | 2.5 | 90 | 23–127 | 33, 115, 119 | 48.3 | 11.3 | 310 | 27.4 | 0.8919 | −54 |
| 21 | 5.0 | 90 | 25–126 | 34, 117, 120 | 61.9 | 3.4 | 50.8 | 14.9 | 0.9133 | −61 |

[a]Reaction Conditions: T = 18° C., t = 45 min., [Zr] = 13 mM, MAO = 200 mg, $P_e$ = 188 psig, $V_{Hexene}$ = 20 mL, $V_{Hexanes}$ = 58 mL, $V_{Total}$ = 80 mL.
[b]The amount of hydrogen added was estimated using the ideal gas law.
[c]% E is given as a mol %.
[d]Measured by high temperature GPC.
[e]PDI = $M_w/M_n$.
[f]Molecular weights were not determined (nd) for this sample.

TABLE 8

Mechanical Properties of Ethylene-Hexene Copolymers

| Example | 19 | 20 | 21 |
|---|---|---|---|
| Tensile Strength (MPa) | 8.8 | 10.9 | 5.4 |
| Tensile Modulus (MPa) | 10.3 | 24.9 | 39.9 |
| Elong. at Break (%) | 360 | 674 | 636 |
| Elong. after Break (%) | 57 | 246 | 393 |
| 100% Elongation, 3 Cycle Test:[a] | | | |
| stress relax. (%), 30 seconds, 1st cycle | 17 | 28 | 39 |
| % retained force, 2nd cycle | 29 | 4.3 | 0 |
| % set cumulative | 13 | 28 | 57 |
| Stress Relaxation, 50% elongation, 5 min | 25 | 40 | — |

[a]Three extension cycles to 100% elongation, 30 seconds hold at extension, 60 seconds at recovery. Set values are based on strain at which stress exceeds baseline on third extension.

TABLE 9

Solvent Fractionation of Ethylene-1-Hexene Copolymers

| Fraction | wt. %[a] | mol % E | $T_m$ (range) (° C.) | $T_m$ (peaks) (° C.) | $\Delta H_f$ (J/g) |
|---|---|---|---|---|---|
| Whole (No $H_2$, Ex. 19) | 100 | 90 | 11–117 | 20, 40, 105 | 31 |
| Heptane Soluble[b] | 15 | 89 | 24–116 | 33, 101 | 17 |
| Heptane Insoluble[b] | 85 | 88 | 21–123 | 33, 48, 112 | 21.2 |
| Heptane Soluble 2[c] | 58 | 87 | 26–121 | 35, 50, 105 | 19.1 |
| Heptane Sol/Insol.[c,d] | 20 | 91 | nd[e] | nd[e] | nd[e] |
| Heptane Insoluble 2[c] | 22 | 91 | 25–123 | 38, 52, 112 | 33.7 |
| Whole (2.5 mmol $H_2$, Ex. 20)) | 100 | 90 | 23–127 | 33, 115, 119 | 48.3 |
| Ether Soluble | 13 | 85 | 26–62 | 35, 50 | 13.0 |
| Ether Insol./Heptane Sol. | 82 | 89 | 27–122 | 32, 109 | 49.0 |
| Heptane Soluble | 95 | 90 | 25–122 | 32, 55, 106 113 | 35.6 |
| Heptane Insoluble | 5 | 96 | 26–130 | 123 | 81.5 |
| Whole (5 mmol $H_2$, Ex. 21) | 100 | 90 | 25–126 | 34, 117, 120 | 61.9 |
| Ether Soluble | 34 | 85 | 27–62 | 33, 51 | 13.9 |
| Ether Insol./Heptane Sol. | 60 | 93 | 24–124 | 33, 82, 107, 115 | 88.8 |

TABLE 9-continued

Solvent Fractionation of Ethylene-1-Hexene Copolymers

| Fraction | wt. %[a] | mol % E | $T_m$ (range) (° C.) | $T_m$ (peaks) (° C.) | $\Delta H_f$ (J/g) |
|---|---|---|---|---|---|
| Heptane Soluble | 94 | 90 | 24–123 | 30, 40, 95, 120 | 58.8 |
| Heptane Insoluble | 6 | 100 | 60–139 | 127 | 91.8 |

[a](wt. % heptane insoluble) + (wt. % heptane soluble) = 100. (wt. % ether soluble) + (wt. % ether insoluble) = (wt. % heptane soluble).
[b]The material was extracted with heptane for 24 h.
[c]The material was extracted with heptane for 72 h.
[d]This fraction was initially soluble in heptane but precipitated in the receiving flask.
[e]nd = not determined.

Segregation Fractionation Technique (SFT)

The average degree of short chain branching in an ethylene-α-olefin copolymer can be independently ascertained by $^{13}$C NMR (SCB/1000 C's=1000{%O/[n(%O)+2(%E)]}; %O=mol % α-olefin in the copolymer, n=length of the α-olefin, SCB/1000 C's=the number of short chain branches per 1000 carbons).

Ethylene-α-olefin copolymers can be fractionated in situ by DSC by subjecting the material to a series of isothermal crystallization steps beginning in the melt and proceeding at successively lower temperatures. Because uninterrupted ethylene sequences of variable length form crystals of differing sizes and melting points, this procedure separates the DSC melting profile into a series of peaks which correspond to sections of the polymer with different degrees of short chain branching. The ethylene-1-hexene copolymer of Ex. 7 and its selected fractions reported in Table 5 were analyzed by this segregation fractionation technique (SFT). The copolymers were initially heated to the melt (180° C.) and then cooled to 120° C. The materials were isothermally annealed at this temperature for 2 h and then the temperature was quickly lowered by 15° C. The procedure was repeated until the temperature reached 30° C. The samples were then slowly reheated from 30 to 180° C. to record the fractionated DSC profile.

Figure 4:
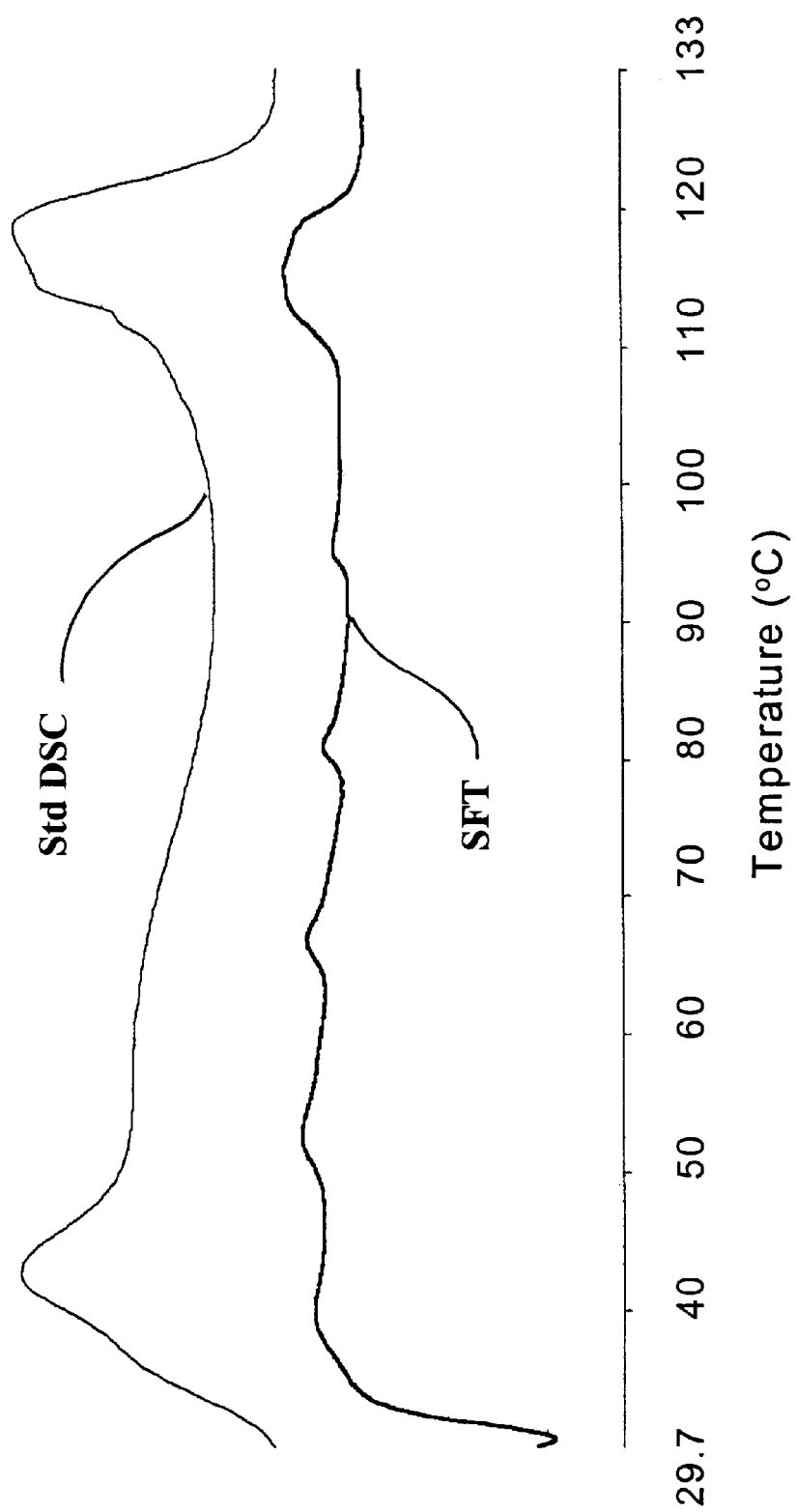
FIG. 4 shows a DSC profile for an ethylene-1-hexene copolymer containing 72 mol % ethylene, wherein the top trace is a standard DSC and the bottom is a SFT trace.

The ethylene-1-hexene copolymers of Ex. 4 was also fractionated using this SFT technique and the result is shown in FIG. 4.

The degree of short chain branching measured by $^{13}$C NMR and estimated by SFT are reported in Table 10. For the whole polymer and the ether, pentane, THF, and hexanes soluble components, a higher degree of short chain branching was observed by $^{13}$C NMR than estimated by DSC. For the cyclohexane and heptane soluble components, the short chain branching distributions estimated by DSC overlap those determined by $^{13}$C NMR. Since the SFT method assumes a random polymer to estimate the number of short chain branches, this data is indicative of a blocky polymer (more branches are needed to depress the melting point).

Comparison To Random Copolymers

Many of the copolymers of this invention show an upper peak melting temperature above that expected for a random copolymer of the same monomer unit composition.

Figure 5:
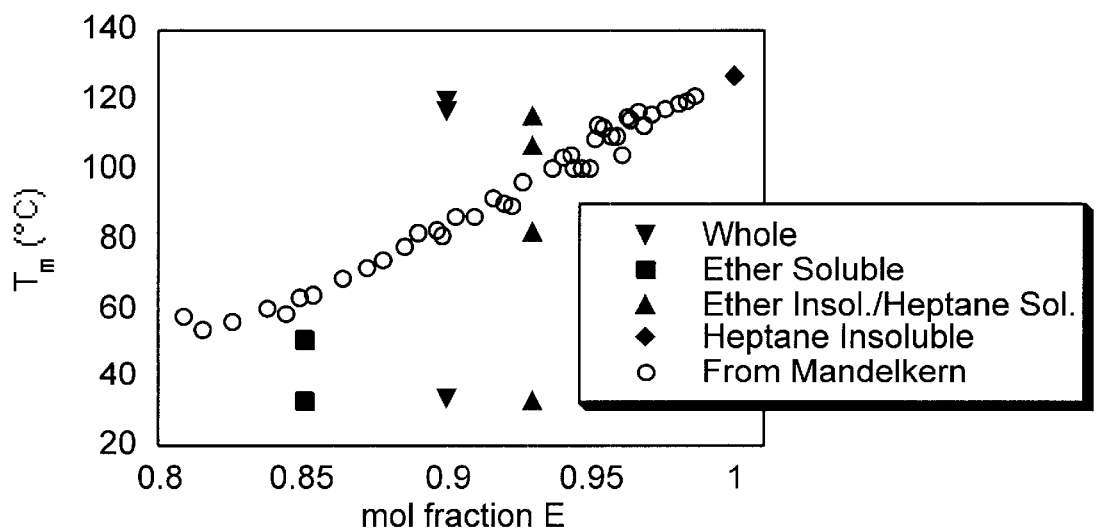
FIG. 5 shows melting temperature vs. composition plotted for the ethylene-1-hexene copolymer of Example 19 with its solvent fractions (cf. Table 9), and by way of comparison also plotted is data for random alpha-olefin copolymers.
Figure 6:
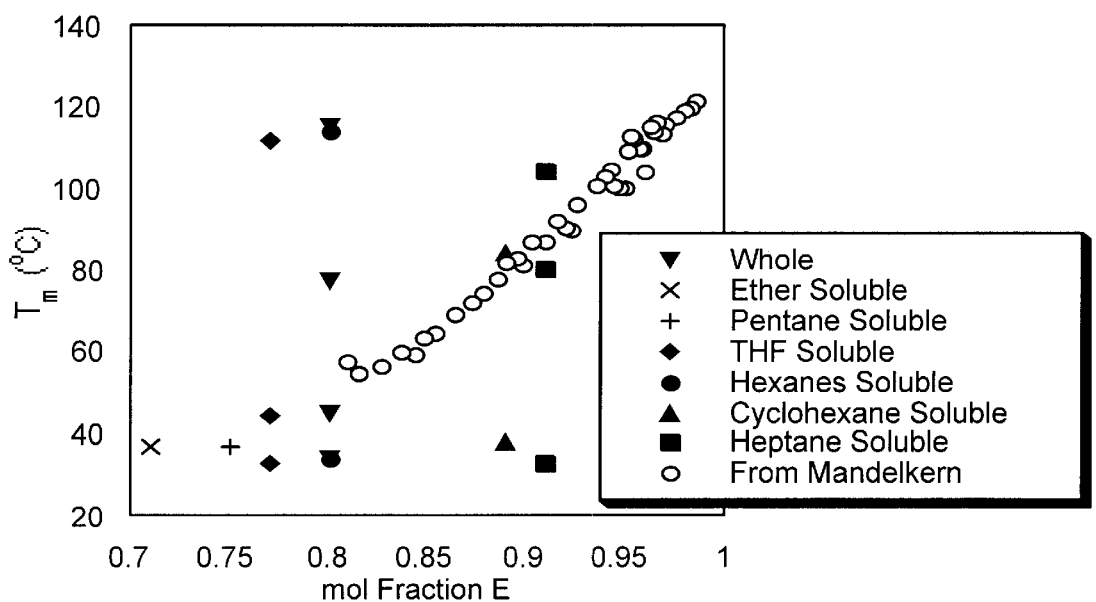
FIG. 6 shows melting temperature vs. composition plotted for the ethylene-1-hexene copolymer of Example 7 with its solvent fractions (cf. Table 5), and by way of comparison also plotted is data for random alpha-olefin copolymers.

Mandelkern and coworkers examined the melting behavior of a variety of random ethylene-a-olefin copolymers over a range of compositions. For details, see Alamo and Mandelkern, *Thermochemica Acta*, 1994, v.238, pp. 155–201, incorporated by reference herein. It was determined that a plot of $T_m$ vs composition was essentially independent of the identity of $C_nH_{2n}$ when n is greater than or equal to four. However, for copolymers with a given ethylene content, the melting temperatures were affected by the molecular weight of the material. The peak melting temperature decreased by 7–8° C. as the molecular weight of the copolymer increased from 4500–500,000. Ethylene-1-hexene copolymers produced with metallocene 4 and their solvent fractions were compared to the random copolymers described by Mandelkern ($M_w$=90,000±20,000) to determine if these materials exhibit melting behavior consistent with a non-random sequence distribution (FIGS. 5 and 6). In particular, a high ethylene content, low molecular weight sample ($M_n$=3,400, $M_w$=50,800; Example 19) was compared to the Mandelkern data. Preferably, comparison of upper peak melting temperature of products of this invention to random copolymers with similar composition also is done with polymers with similar molecular weights. The ether insoluble/heptane soluble fraction comprised 60% of this copolymer. This solvent fraction exhibits a maximum peak melting temperature approximately 20° C. higher than the random copolymers considered by Mandelkern. This suggests that this fraction contains long crystallizable sequences. As this fraction is soluble in heptane the crystallizable sequences are not derived from an ethylene homopolymer. These results indicate that at least 60% of this copolymer exhibits a blocky character.

A high molecular weight copolymer prepared with metallocene 4 and containing 79 mol %E ($M_w$~1,000,000; Example 7, Table 5) was also compared to the random copolymers reported by Mandelkern (FIG. 6). In particular, the hexanes soluble portion of the material exhibits a maximum peak melting temperature over 50° C. higher than a random copolymer with identical composition. The THF and heptane soluble portions of this copolymer also exhibit melting temperatures that are higher than expected for a random copolymer. These results suggest that a significant portion of this copolymer is blocky in character.

These results show it is not only the whole polymer that exhibits melting temperatures that are higher than expected. As described above and depicted in FIGS. 5 and 6, certain solvent fractions exhibit substantially higher melting temperatures than observed for random copolymers of similar composition. Once the solvent extractions have been performed, the fractionated materials are less likely to be simple blends of copolymers with different melting temperatures.

TABLE 10

Short Chain Branching and Solvent Fractions Distributions for an Ethylene-1-Hexene Copolymer (Example 7)

| Fraction | mol % E | $^{13}$C NMR | SCB/1000 C's SFT |
|---|---|---|---|
| Whole | 79 | 74 | 12–53 |
| Ether Soluble | 71 | 92 | 54[a] |
| Pentane Soluble | 75 | 83 | 54[a] |
| THF Soluble | 77 | 79 | 13–53 |
| Hexanes Soluble | 80 | 71 | 8–53 |
| Cyclohexane Soluble | 89 | 45 | 12–53 |
| Heptane Soluble | 91 | 38 | 13–53 |

[a]SFT was not applied to these fractions because of their low crystallinity and narrow melting transitions. The degree of short chain branching was calculated from the peak melting temperature observed by standard DSC techniques.

EXAMPLES 22–24

A series of ethylene/1-hexene copolymers were prepared using the Catalyst 4 and the polymerization procedures described above. Results are listed in Table 11.

TABLE 11

High Ethylene-Content Copolymers

| Ex. | $T_{pol}$ °C. | Mol % E | Melt Range °C. | $T_m$ °C. | $\Delta Hf$ J/g | $M_n \times 10^{-3}$ | $M_w \times 10^{-3}$ | $M_w/M_n$ | $M_{pk} \times 10^{-3}$ | Density (g/cc) |
|---|---|---|---|---|---|---|---|---|---|---|
| 22 | 18 | 93 | 25–121 | 69, 105 | 72 | 576 | 2010 | 3.5 | 1280 | <.910 |
| 23 | 20 | 98 | 25–119 | 95, 109 | 107 | 538 | 1980 | 3.7 | 1380 | <.910 |
| 24 | 18 | 99 | 30–128 | 119 | 134 | 518 | 1790 | 3.5 | 1220 | .916 |

The samples were analyzed by DSC. These inventive copolymers illustrate an ethylene-1-hexene copolymer having a broad melting transition(~100° C.), a relative high polydispersity (3.5–3.7), a high upper peak melting temperature, and a narrow composition distribution. In Examples 22 and 23 the melting transition is bimodal as measured by DSC.

EXAMPLE 25

Run W

Ethylene-1-hexene copolymer was made in a 1-liter stirred autoclave reactor which was heated to 90° C. and purged with nitrogen. The reactor then was charged with isobutane (750 ml) and tri-isobutylaluminium (3.7 ml of 1M solution in hexanes, supplied by Aldrich), and temperature adjusted to 70° C. After 1 hour, the reactor was charged with 1-hexene (dry, deoxygenated; 10 ml), and ethylene (7.3 bar). In a glovebox, a toluene solution of bis(3–5-di-tertbutylphenyl-2-indenyl)hafnium dichloride (Catalyst 12, 4.05 mg in 1 ml toluene) was mixed with a toluene solution of methylaluminoxane (2.7 ml of 1.78M; supplied by Albemarle). The mixture was injected into the reactor under nitrogen, and ethylene added continuously to maintain a constant pressure. After 1 hour, the reactor was vented and cooled to 20° C. Ethylene-hexene copolymer (16.4 g) was recovered.

A sample of the ethylene-1-hexene copolymer (Ex. 25) made according to this invention, and a typical Ziegler LLDPE (Run W) were pressed into films at 150° C. and then quench cooled. The copolymer of this inventions demonstrated unexpected decrease in haze and increase in clarity compared to the conventional material as presented in Table 12.

TABLE 12

Copolymer Film Properties

|  | Run W | Ex. 25 |
|---|---|---|
| Mw (× 10$^{-3}$) | — | 200 |
| Mn (× 10$^{-3}$) | — | 57 |
| Mw/Mn | — | 3.5 |
| SCB/1000 C | ~20 | 21.5 |
| Density (g/cc) | 0.916 | 0.916 |
| Thickness (mm) | 500 | 500 |
| Gloss (%) - ASTM D2457 | 53 | 67 (96)[b] |
| Haze (%)-ASTM D1003 | 89 | 41 (23)[b] |
| Clarity (%) - ASTM D1746 | 8 | 4 (7)[b] |
| Yield Strength (MPa)[a] | 12.54 | 8.84 |
| Ultimate Tensile Strength (MPa)[a] | 27.96 | 14.58 |

TABLE 12-continued

Copolymer Film Properties

|  | Run W | Ex. 25 |
|---|---|---|
| Elongation (%)[a] | 691 | 360 |
| 1% Secant Modulus (MPa)[a] | 212.2 | 104.2 |

[a]Tensile measurements were carried out at 23 C on 15 mm × 40 mm gauge length strips at 500 mm/min test rate. Tensiles measured according to ISO 1184, DIN 53455.
[b]Values in parentheses were measured after a second pressing of the samples to eliminate bubbles.

Industrial Applicability

It is clear from the general description and the properties tests in the Examples that the copolymers of the invention have wide industrial applicability for use in film and fiber formation, cast extruded and smolded plastic products ranging from thermoplastic plastomers to elastomers.

Copolymer produced according to the method of this invention may be formed into pellets by melt extrusion and chopping, which then may be used to form useful articles such as extruded pipe, molded fittings and containers. Copolymers of this invention may be combined with effective amounts of typical polymer additives known to the art such as heat and uv stabilizers, anti-oxidants, acid scavengers, anti-static agents, and the like. In addition, the copolymers may be combined with colorants and fillers such as glass fiber and talc.

Products made from the copolymers of this invention may be formed by techniques known to the art, such as casting, pressing, blowing, and extruding. Films formed from the copolymers may have thicknesses range from about 0.1 mil (0.00254 mm) to 100 mil (2.54 mm) or more. Typical film thickness may be about 0.25 mil (0.00635 mm) to about 50 mil (1.27 mm) and preferably about 0.5 mil (0.0127 mm) to 20 mil (0.508 mm). Typical films show improved optical properties such as reduced haze and increased clarity compared to typical linear low density polyethylenes. Other useful articles may be manufactured from the copolymers of this invention by conventional techniques such as molding or extrusion.

It should be understood that various modifications within the scope of this invention can be made by one of ordinary skill in the art without departing from the spirit thereof. We therefore wish this invention to be defined by the scope of the appended claims as broadly as the prior art will permit, and in view of the specification if need be.

What is claimed is:

1. A copolymer of ethylene with at least one comonomer containing at least 4 carbon atoms, said copolymer being characterized by a polydispersity greater than 2, a broad melting point range having multiple melting point peaks, said melting point range extending from above about 20° C.

to above about 90° C. and wherein two of said melting point peaks are separated by at least 20° C., a Tm/Xc of above about 80° C., as measured by differential scanning calorimetry, and a narrow composition distribution.

2. The copolymer of claim 1 wherein the comonomer is at least one olefin containing from 4 to about 12 carbon atoms.

3. The copolymer of claim 1 wherein the comonomer is an alpha-olefin containing 4 to about 8 carbon atoms.

4. The copolymer of claim 1 wherein the comonomer is 1-butene, 1-pentene, 1-hexene, 1-octene, or 4-methyl-1-pentene, or mixtures thereof.

5. The copolymer of claim 1 wherein the comonomer is 1-hexene.

6. The copolymer of claim 1 wherein at least one of the melting point peaks is below about 50° C.

7. The copolymer of claim 1 wherein at least one of the melting point peaks is greater than about 100° C.

8. The copolymer of claim 1 wherein the polydispersity is greater than about 3.

9. The copolymer of claim 1 wherein the polydispersity is between about 4 and about 12.

10. The copolymer of claim 1 wherein the copolymer has a solvent-fractionated composition distribution less than or equal to 15%.

11. The copolymer of claim 1 wherein the copolymer has a solvent-fractionated composition distribution less than or equal to 12% and the comonomer is 1-butene, 1-pentene, 1-hexene, 1-octene, or 4-methyl-1-pentene, or mixtures thereof.

12. The copolymer of claim 1 wherein the copolymer has a solvent-fractionated composition distribution less than or equal to 10%.

13. The copolymer of claim 1 wherein the comonomer is 1-butene, 1-hexene, or 1-octene, the composition distribution is less than 12%, at least one of the melting point peaks is greater than 75° C., and the polydispersity is greater than 3.

14. The copolymer of claim 1 which is elastomeric.

15. The copolymer of claim 1 which is plastomeric.

16. The copolymer of claim 1 wherein the copolymer has a molecular weight-fractionated composition distribution of less than about 5%.

17. The copolymer of claim 1 wherein the copolymer contains about 1 to about 50 mole percent of comonomer.

18. The copolymer of claim 17 wherein the copolymer contains up to about 40 mole percent of comonomer.

19. The copolymer of claim 1 wherein the copolymer contains up to about 10 mole percent comonomer.

20. The copolymer of claim 19 wherein the copolymer contains from 1 to about 5 mole percent comonomer.

21. The copolymer of claim 1, wherein the copolymer is formed as a pellet.

22. The copolymer of claim 21, wherein said pellet contains polymer stabilizers.

23. The copolymer of claim 1, wherein the copolymer is formed as a molded or extruded article.

24. The copolymer of claim 23, wherein said article is a pipe or a container.

25. The copolymer of claim 1, wherein the copolymer is formed as a film.

26. The copolymer of claim 25, wherein said copolymer film has a thickness of from about 0.1 to about 100 mil.

27. The film of claim 26 with a thickness from 0.5 to 20 mil.

28. A copolymer of ethylene with at least one comonomer containing at least 4 carbon atoms characterized by at least one peak melting point having a melting point index, Tm/Xc, above about 80° C.

29. The copolymer of claim 28 in which at least one comonomer contains 6 carbon atoms.

30. The copolymer of claim 28 which is an elastomer.

31. The copolymer of claim 28 which is a plastomer.

32. The copolymer of claim 31, wherein the copolymer is formed as a film.

33. The copolymer of claim 28 wherein the copolymer has a solvent-fractionated composition distribution less than about 15%.

34. The copolymer of claim 33 in which at least one comonomer is an alpha olefin which contains 4 to about 10 carbon atoms.

35. The copolymer of claim 1 wherein the copolymer contains from about 1 to about 40 mole percent of comonomer.

36. The copolymer of claim 35 wherein the copolymer has a solvent-fractionated composition distribution less than about 12%.

37. The copolymer of claim 36 wherein the copolymer has a polydispersity of above 2 to about 12.

38. The copolymer of claim 37 wherein the copolymer contains up to 10 mole percent comonomer.

39. The copolymer of claim 38 wherein the copolymer is plastomeric and which contains from 1 to about 5 mole percent comonomer.

40. The copolymer of claim 1 wherein the upper end of the melting point range is greater than about 90° C., and the Tm/Xc is greater than about 115° C.

41. The copolymer of claim 1 wherein said melting point peak separation is at least 40° C.

42. The copolymer of claim 41 wherein said melting point peak separation is at least 60° C.

* * * * *